(12) United States Patent
Zuo et al.

(10) Patent No.: US 12,726,145 B2
(45) Date of Patent: Sep. 1, 2026

(54) ENHANCED I/F CONTROL SYSTEM AND METHOD FOR PERMANENT MAGNET SYNCHRONOUS MACHINES

(71) Applicants: MAGNA Powertrain GmbH & Co KG, Lannach (AT); Ying Zuo, Montreal (CA); Chunyan Lai, Montreal (CA); Lakshmi Varaha Iyer, Windsro (CA); Anastasiia Galkina, Linz (AT); Martin Grossbichler, Aschach/Steyr (AT)

(72) Inventors: Ying Zuo, Montreal (CA); Chunyan Lai, Montreal (CA); Lakshmi Varaha Iyer, Windsro (CA); Anastasiia Galkina, Linz (AT); Martin Grossbichler, Aschach/Steyr (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 232 days.

(21) Appl. No.: 18/832,621

(22) PCT Filed: Jan. 23, 2023

(86) PCT No.: PCT/US2023/011317

§ 371 (c)(1),
(2) Date: Jul. 24, 2024

(87) PCT Pub. No.: WO2023/146814

PCT Pub. Date: Aug. 3, 2023

(65) Prior Publication Data

US 2025/0167706 A1 May 22, 2025

Related U.S. Application Data

(60) Provisional application No. 63/302,752, filed on Jan. 25, 2022.

(51) Int. Cl.
*H02P 21/34* (2016.01)
*H02P 21/13* (2006.01)
(Continued)

(52) U.S. Cl.
CPC .............. *H02P 21/34* (2016.02); *H02P 21/13* (2013.01); *H02P 21/18* (2016.02); *H02P 21/22* (2016.02); *H02P 2207/05* (2013.01)

(58) Field of Classification Search
CPC .......... H02P 21/34; H02P 21/18; H02P 21/22; H02P 21/13; H02P 2207/05
See application file for complete search history.

(56) References Cited

U.S. PATENT DOCUMENTS 6,703,809 B2 3/2004 Royak et al.
2010/0237817 A1 9/2010 Liu et al.
(Continued)

*Primary Examiner* — Zoheb S Imtiaz
(74) *Attorney, Agent, or Firm* — DICKINSON WRIGHT PLLC

(57) ABSTRACT

A method of operating a motor drive includes injecting a high frequency signal to determine position error information in order to automatically adjust the magnitude of stator current in I/F control. The method includes: determining a load-based q-axis current corresponding to a load of an electric machine; determining an adjusted q-axis reference current based on the load-based q-axis current; determining d, q-axis reference voltages based on corresponding d-axis and q-axis reference currents; determining α,β-axis reference voltages based on the d, q-axis reference voltages and a reference rotor position; commanding an inverter based on the α,β-axis reference voltages; increasing the reference rotor angular frequency while the d-axis reference current is zero and while the q-axis reference current is maintained at a constant value; adding an injection voltage signal to the d-axis reference voltage, and using a sum of the injection voltage signal and the d-axis reference voltage to determine the α,β-axis voltages.

20 Claims, 15 Drawing Sheets

(51) Int. Cl.
*H02P 21/18* (2016.01)
*H02P 21/22* (2016.01)

(56) References Cited

U.S. PATENT DOCUMENTS

2010/0264860 A1 10/2010 Jun et al.
2013/0231891 A1 9/2013 Long et al.
2016/0352276 A1 12/2016 Pramod et al.
2021/0399662 A1* 12/2021 Seilmeier ................ H02P 21/18
2024/0258944 A1* 8/2024 Pennington, III ........ H02P 6/08

* cited by examiner

ENHANCED I/F CONTROL SYSTEM AND METHOD FOR PERMANENT MAGNET SYNCHRONOUS MACHINES

CROSS-REFERENCE TO RELATED APPLICATION

This U.S. National Stage Patent Application claims the benefit of PCT International Patent Application Serial No. PCT/US2023/011317 filed Jan. 23, 2023 entitled "ENHANCED I/F CONTROL SYSTEM AND METHOD FOR PERMANENT MAGNET SYNCHRONOUS MACHINES" which claims the benefit of U.S. Provisional Patent Application Ser. No. 63/302,752, filed on Jan. 25, 2022 and titled "Enhanced I/F Control System And Method For Permanent Magnet Synchronous Machines," the entire disclosures of which are hereby incorporated by reference.

FIELD

The present disclosure relates generally to systems and methods for controlling a motor drive for powering an alternating current motor. More specifically, the present disclosure relates to enhancements to Current/Frequency (I/F) control of motor drives in powering permanent magnet synchronous motors (PMSMs).

BACKGROUND

Permanent magnet synchronous machines (PMSMs) are widely used in electric vehicle (EV) applications due to their high efficiency, high power density, light weight and compactness. Safety and reliability are of important considerations in electric machines. For PMSMs, high-precision control strategies, such as direct torque control and vector control, which rely on accurate sensors to obtain the information of rotor position and speed may be used to provide a desired system performance. However, mechanical sensors may be susceptible to environment and can degrade system stability. Therefore, there has been an increasing attention paid to sensorless control strategies for PMSMs. In medium and high speed regions, model-based methods, such as the Luenberger observer method, the sliding mode observer (SMO) method, and the model reference adaptive observer method, may be used to estimate a motor position based on the back electromotive force (EMF). However, these methods cannot be used in the start-up and low speed region for PMSMs where the signal-to-noise ratio of back EMF is small. To solve this issue, the high frequency (HF) signal injection has been proposed. However, such methods may be limited because of the complex signal processing and because of acoustic noise that can result from such HF signal injection.

An open-loop current with frequency ramp (I/F) method is commonly used to control startup of a motor without a position sensor. The I/F method may also be called I-F. In the traditional I/F method, a fixed high amplitude current vector is applied with a pre-defined reference frequency ramp to start the machine. However, this fixed high amplitude current can cause large oscillation during the start-up, which can reduce the system efficiency.

SUMMARY

In accordance with an aspect of the disclosure, a method of operating a motor drive is provided. The method includes: determining a d-axis difference current based on a difference between a d-axis reference current and an actual d-axis current supplied by an inverter to an electric machine; determining a load-based q-axis current corresponding to a load of the electric machine; determining an adjusted q-axis reference current based on a q-axis reference current and the load-based q-axis current; determining a q-axis difference current based on a difference between the adjusted q-axis reference current and an actual q-axis current supplied by the inverter to the electric machine; determining a d-axis reference voltage based on the d-axis reference current; determining a q-axis reference voltage based on the q-axis reference current; determining an $\alpha$-axis reference voltage and a $\beta$-axis reference voltage based on the d-axis reference voltage, the q-axis reference voltage, and a reference rotor position; determining the reference rotor position based on a reference rotor angular frequency; commanding a plurality of switches of the inverter to apply an output voltage to the electric machine based on the $\alpha$-axis reference voltage and the $\beta$-axis reference voltage; increasing the reference rotor angular frequency over a startup period of time while the d-axis reference current is zero and while the q-axis reference current is maintained at a constant value; and adding an injection voltage signal to the d-axis reference voltage. Determining the $\alpha$-axis reference voltage and the $\beta$-axis reference voltage includes adding an injection voltage signal to the d-axis reference voltage.

In accordance with an aspect of the disclosure, a motor drive system is disclosed. The motor drive system includes a controller. The controller is configured to: determine a d-axis difference current based on a difference between a d-axis reference current and an actual d-axis current supplied by an inverter to an electric machine; determine a load-based q-axis current corresponding to a load of the electric machine; determine an adjusted q-axis reference current based on a q-axis reference current and the load-based q-axis current; determine a q-axis difference current based on a difference between the adjusted q-axis reference current and an actual q-axis current supplied by the inverter to the electric machine; determine a d-axis reference voltage based on the d-axis reference current; determine a q-axis reference voltage based on the q-axis reference current; determine an $\alpha$-axis reference voltage and a $\beta$-axis reference voltage based on the d-axis reference voltage, the q-axis reference voltage, and a reference rotor position; determine the reference rotor position based on a reference rotor angular frequency; command a plurality of switches of the inverter to apply an output voltage to the electric machine based on the $\alpha$-axis reference voltage and the $\beta$-axis reference voltage; increase the reference rotor angular frequency over a startup period of time while the d-axis reference current is zero and while the q-axis reference current is maintained at a constant value; add an injection voltage signal to the d-axis reference voltage; and determine, using a sum of the injection voltage signal and the d-axis reference voltage, the $\alpha$-axis reference voltage and the j-axis reference voltage.

BRIEF DESCRIPTION OF THE DRAWINGS

Further details, features and advantages of designs of the invention result from the following description of embodiment examples in reference to the associated drawings.

DETAILED DESCRIPTION

Figure 1:
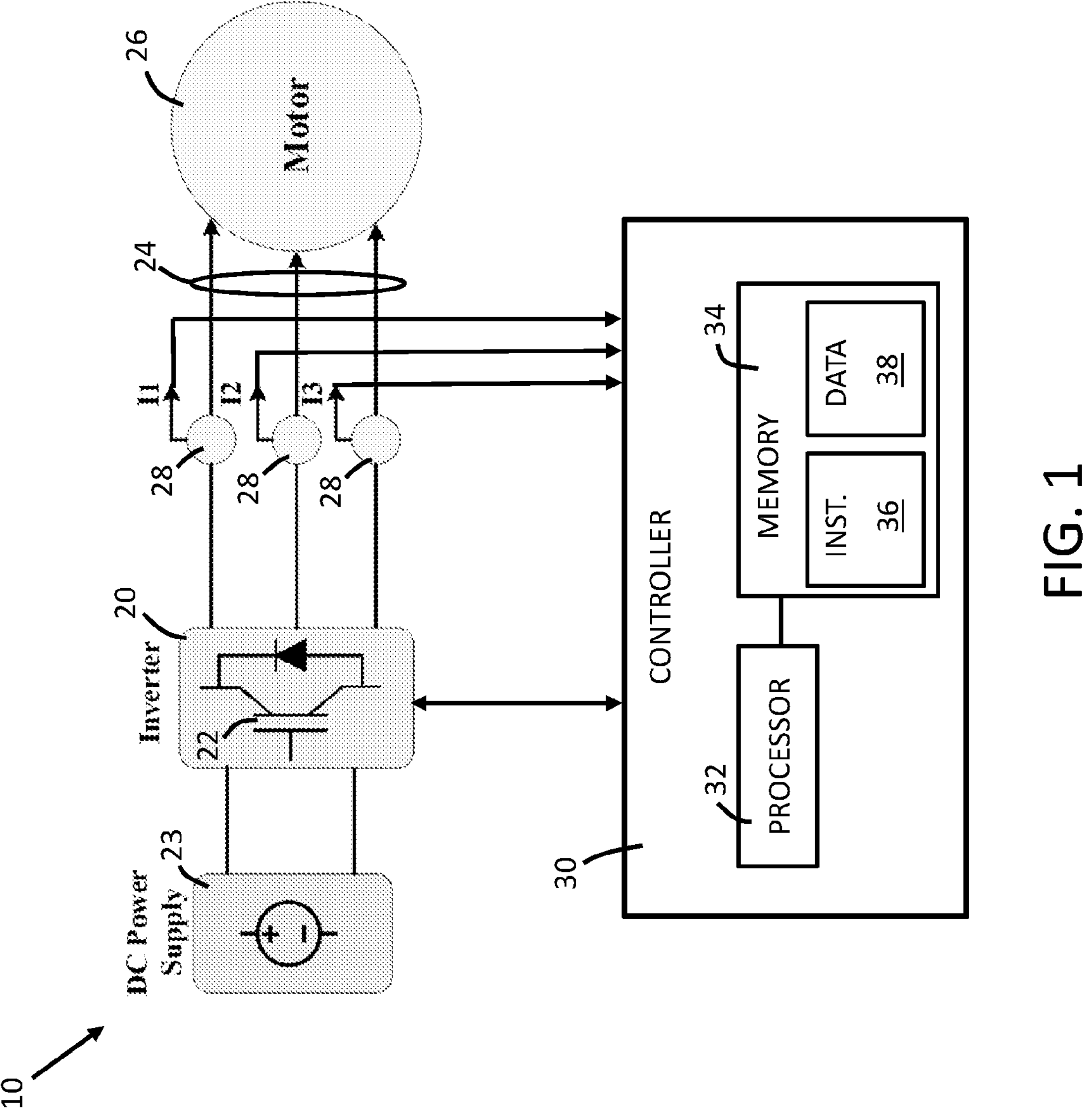
FIG. 1 shows a schematic block diagram of a motor control system in accordance with an aspect of the present disclosure.

Referring to the Figures, wherein like numerals indicate corresponding parts throughout the several views, a system and method of operating a motor drive is disclosed. More specifically, this disclosure describes the method in by way of an example method for operating a motor drive to control operation of an electric machine, such as an electric motor or a motor/generator. In some embodiments, the method may be performed using hardware components, such as a motor drive and controller, that are already in place for operating the electric machine.

An open-loop current with frequency ramp (I/F) method is commonly used to control startup of an electric machine, such as a motor, without a position sensor. Such an I/F method uses open-loop control with a fixed high amplitude current vector and a pre-defined reference frequency ramp to start the electric machine. I/F control has some shortcomings including the low efficiency and high speed ripples. An enhanced I/F control strategy for permanent magnet synchronous machines (PMSMs) is presented in the present disclosure. The method of the present disclosure provides for injection of a high frequency square wave type voltage signal to obtain the position error information in order to automatically adjust a magnitude of stator current. Although the high frequency signal is injected, only simple arithmetic operations are used during the demodulation process. Furthermore, the demodulation process of the present disclosure may not require use of filters. Simulation results show that the proposed I/F control scheme has higher efficiency than the traditional I/F control method. Both the speed and torque ripples caused by the high current vector in the traditional I/F control are minimized.

An enhanced IF method is provided in the present disclosure. The enhanced I/F method to improve the efficiency of the drive system under I/F control. The position error between an estimated synchronous frame and a real rotor synchronous frame is obtained by injecting high frequency signal in the estimated synchronous frame. After obtaining the position error information, a proportional-integral (PI) controller is used to force it to zero, which can adjust q-axis current to a desired level according to the actual load level. Additionally, the d-axis reference current can be calculated using a Maximum Torque Per Ampere (MTPA) control strategy to further reduce the copper losses. In the meanwhile, the speed of the estimated synchronous frame is compensated under load changes based on the position error information. Although the high frequency signal is injected, only simple arithmetic operations are used during the demodulation process which does not require filters. Compared to the conventional high frequency injection method with complex filters during demodulation, the proposed method provides a simpler implementation with less computation burden. The enhanced I/F method of the present disclosure does not require knowledge of parameters of the electric machine and does not require extra equipment. This provides advantages over traditional I/F startup control techniques.

FIG. 1 shows a block diagram of system 10 in accordance with an aspect of the present disclosure. The system 10 includes an inverter 20 having one or more solid-state switches 22, such as field effect transistors (FETs) configured to switch current from a DC power supply 23 and to generate an AC power upon a set of motor leads 24. The motor leads 24 transmit electrical power between the inverter 20 and an electric motor 26. The electric motor 26 may be a permanent magnet synchronous machine (PMSM). However, the system 10 may be used with other types of electric machines such as wound field machines, inductance machines, and/or reluctance machines. The electric motor 26 is shown as a 3-phase machine, however, the electric motor 26 may have any number of phases. For example, the electric motor 26 may be a single-phase machine, a 3-phase machine, or a higher-order multiphase machine. The electric motor 26 may be used as a motor, a generator, or as a motor/generator that functions as both a motor and a generator. Current sensors 28 measure currents in corresponding ones of the motor leads 24. The system 10 may include other sensors, such as voltage sensors configured to measure voltages upon or between the motor leads 24.

The system 10 of FIG. 1 also includes a controller 30 in communication with the current sensors 28 to measure the currents in the motor leads 24. The controller 30 may also be in functional communication with the inverter 20 to control operation of the motor drive 30 and/or to monitor parameters measured by sensors associated with the inverter 20. The controller 30 includes a processor 32 coupled to a storage memory 34. The storage memory 34 stores instructions, such as program code for execution by the processor 32. The storage memory 34 also includes data storage 38 for holding data to be used by the processor 32. The data storage 38 may record, for example, values of the parameters measured by the current sensors 28 and/or the outcome of functions calculated by the processor 32.

Traditional I/F Based Sensorless Control

Figure 2:
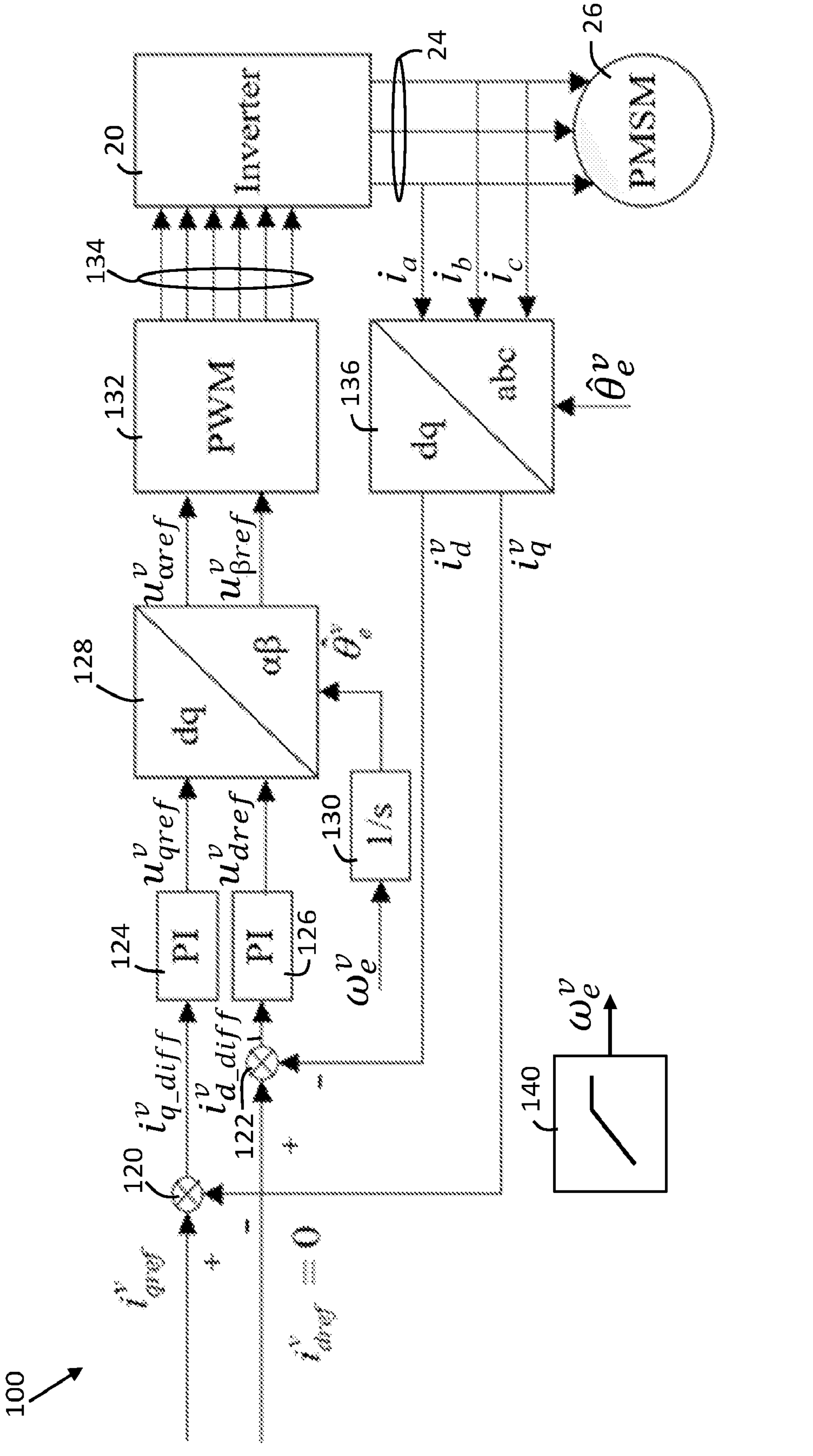
FIG. 2 shows a block diagram of a motor control system with traditional I/F startup control.

FIG. 2 shows a block diagram of a first motor control system 100 with traditional I/F startup control.

The angular velocity and angle of I/F control are obtained by integrating an acceleration curve. The coordinate system generated by this angle is called virtual synchronization coordinates. Variables in the virtual coordinate system are represented by a superscript "v". The current feedback of the machine is realized by giving d and q axis current reference values in the virtual coordinate system. Therefore, the I/F control is a kind of speed opened-loop and current closed-loop control. The current closed loop makes the system current constrained by the reference value and avoids the overcurrent phenomenon. However, the fixed reference current amplitude reduces the system efficiency. In addition, since the speed loop is open in the traditional I/F sensorless control, it can cause loss of synchronism.

As shown in FIG. 2, the first motor control system 100 includes a first difference block 120 configured to subtract an actual q-axis current $$i_q^v$$

from a q-axis reference current $$i_{qref}^v$$

to determine a q-axis difference current $$i_{q\_diff}^v.$$

The first motor control system 100 also includes a second difference block 122 configured to subtract an actual d-axis current $$i_d^v$$

from a d-axis reference current $$i_{dref}^v$$

to determine a d-axis difference current $$i_{d\_diff}^v.$$

As shown in FIG. 2, the d-axis reference current $$i_{dref}^v$$

may set to zero (0). The first motor control system 100 also includes a first Proportional-Integral (PI) controller 124 configured to determine a q-axis reference voltage $$u_{qref}^v$$

based on the q-axis difference current $$i_{q\_diff}^v.$$

The first motor control system 100 also includes a second PI controller 126 configured to determine a d-axis reference voltage $$u_{dref}^v$$

based on the d-axis difference current $$i_{d\_diff}^v.$$

The first motor control system 100 also includes a first transform block 128 configured to transform the q-axis reference voltage $$u_{qref}^v$$

and the d-axis reference voltage $$u_{dref}^v$$

to the αβ domain and to calculate an α-axis reference voltage $$u_{\alpha ref}^v$$

and a β-axis reference voltage $$u_{\beta ref}^v$$

based on the dq reference voltages $$u_{qref}^v, u_{dref}^v$$

and based on a reference rotor position $$\hat{\theta}_e^v.$$

The first motor control system 100 also includes an integrator 130 that calculates the reference rotor position $$\hat{\theta}_e^v$$

based on a ramp speed command $$\omega_e^v.$$

The first motor control system 100 also includes a pulse-width modulator 132 configured to generate pulse width modulation (PWM) signals on a plurality of control lines 134 for controlling the solid-state switches 22 of the inverter 20 based on the α-axis reference voltage $$u_{\alpha ref}^v$$

and the β-axis reference voltage $$u_{\beta ref}^v,$$

thereby causing the inverter 20 to apply corresponding voltage waveforms to the electric motor 26 via the motor leads 24.

The first motor control system 100 also includes a second transform block 136 configured to transform time-domain phase current signals $i_a$, $i_b$, $i_c$ to the d-q domain and generate a d-axis current signal $$i_d^v$$

and a q-axis current signal $$i_q^v$$

based on the time-domain phase current signals $i_a$, $i_b$, $i_c$ and based on the reference rotor position $$\hat{\theta}_e^v.$$

The first motor control system 100 also includes a speed ramp 140 configured to determine the ramp speed command $$\omega_e^v$$

by increasing the ramp speed command $$\omega_e^v$$

from an initial value to a final value over a startup period of time when the electric motor 26 is starting to be controlled by the first motor control system 100. The final value may be a predetermined value. Alternatively or additionally, the final value may be determined based on a speed control setting value. For example, the initial value may be a zero speed setting, and the final value may be 200 radians/second.

The reference rotor position is obtained by integrating the ramp speed command:

$$\omega_e^v = K_\omega t \tag{1}$$

$$\theta_e^v = \int \omega_e^v dt \tag{2}$$

where $$\omega_e^v$$

is the speed command, $$\theta_e^v$$

is the reference position and $K_\omega$ is a constant.

For PMSMs, the motor torque can be expressed as equation (3), below:

$$T_e = 1.5 n_p i_q [\psi_f - (L_q - L_d) i_d] \tag{3}$$

where $i_d$, $i_q$, $L_d$ and $L_q$ are the stator current components and inductances along the direct axis (d-axis) and the quadrature axis (q-axis); $n_p$ is the number of pole pairs and $\psi_f$ is the permanent magnet flux linkage.

Figure 3:
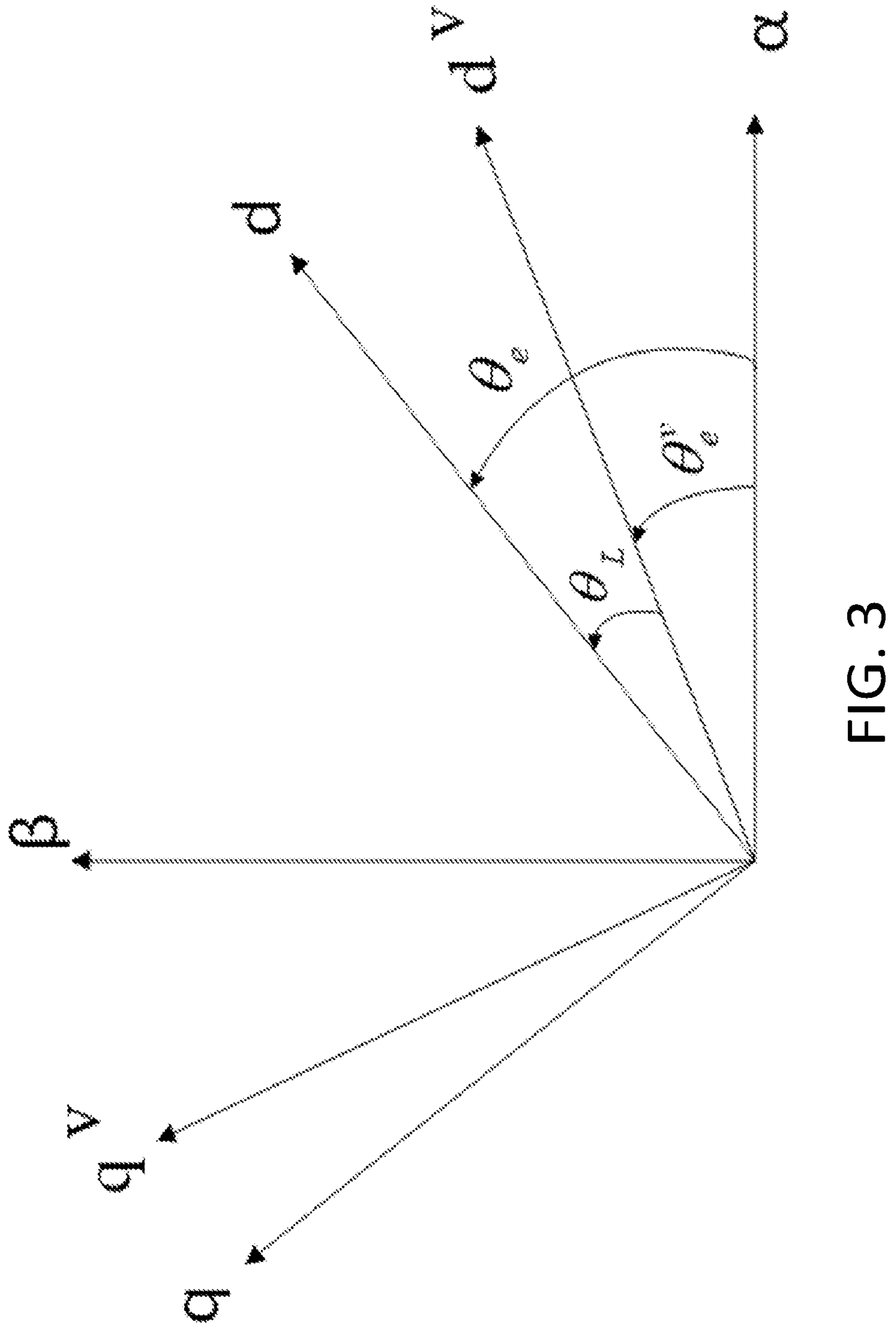
FIG. 3 shows a phasor diagram in d,q and $d^v q^v$ axes in ramp speed operation.

FIG. 3 shows a phasor diagram in d,q and $d^v q^v$ axes in ramp speed operation. In consideration of the deviating angle $\theta_L$ between the real frame and the virtual frame as shown in FIG. 3, the stator current can be expressed as:

$$\begin{cases} i_q = i_q^v \cos\theta_L - i_d^v \sin\theta_L \\ i_d = i_q^v \sin\theta_L + i_d^v \cos\theta_L \end{cases} \tag{4}$$

where $$i_d^v \text{ and } i_q^v$$

are the reference current along the virtual d-axis and q-axis.

Substituting equation (4) into equation (3) and consider $$i_d^v = 0$$

for simplifying and $\theta_L$ is small, the motor torque $T_e$ can be rewritten as equation (5), below:

$$T_e = 1.5 n_p \left(i_q^v \cos\theta_L\right) \psi_f \tag{5}$$

To operate under different load conditions, a q-axis current $$i_q^v$$

is set manually as maximum values to satisfy the torque requirement at the beginning in the traditional I/f method, which causes large oscillation during the start-up. To automatically adjust the q-axis current $$i_q^v$$

under different load conditions, the closed loop for position error control is added in the proposed method to force $\theta_L$ to be zero in order to keep q-axis current to a desired level according to the actual load level. Once the q-axis current achieves the desired level, the d-axis reference current will be calculated based on Maximum Torque Per Ampere (MTPA) control strategy to further reduce the copper losses.

Position Error Extraction

To obtain the position error between virtual synchronous frame and real rotor synchronous frame, this paper proposes a square wave voltage injection based position error extraction scheme without using additional filters for I/F based sensorless control.

The frequency of the injected square wave voltage signal is much greater than the fundamental wave operating frequency. Therefore, ignoring the influence of stator resistance voltage drop and back electromotive force, the voltage matrix for PMSM under high frequency (HF) signal injection can be identified by equation (6).

$$\begin{bmatrix} u_{dh} \\ u_{qh} \end{bmatrix} = \begin{bmatrix} pL_d & 0 \\ 0 & pL_q \end{bmatrix} \begin{bmatrix} i_{dh} \\ i_{qh} \end{bmatrix} \tag{6}$$

where $u_{dh}$ and $u_{qh}$ are high-frequency (HF) voltage components in the d-axis and the q-axis, respectively; $i_{dh}$, $i_{qh}$ are HF current components in the d-axis and the q-axis, respectively; and p is d/dt.

The HF square wave signal, as represented by matrix (7), below, is injected into the d-axis voltage command signal $$u_{dref}^v.$$

$$\begin{bmatrix} u_{d\_inj}^v \\ u_{q\_inj}^v \end{bmatrix} = \begin{bmatrix} U_{inj} f(n) \\ 0 \end{bmatrix} \tag{7}$$

where $$u_{d\_inj}^v \text{ and } u_{q\_inj}^v$$

are the injected HF voltage signals in the $d^v q^v$-axis, $U_{inj}$ is the amplitude of injected HF voltage signal, f(n) is the sequence of injected HF voltage signal, and n is the discrete sampling time.

The HF current matrix in the $d^v q^v$-axis can be derived using equation (8), below:

$$\begin{bmatrix} pi_{dh}^v \\ pi_{qh}^v \end{bmatrix} = u_{d\_inj}^v \begin{bmatrix} \dfrac{\cos^2\theta_L}{L_d} + \dfrac{\sin^2\theta_L}{L_q} \\ \dfrac{1}{2}\left(\dfrac{1}{L_d} - \dfrac{1}{L_q}\right)\sin 2\theta_L \end{bmatrix} \tag{8}$$

As can be seen from equation (8), the position error $\theta_L$ is proportional to the derivative of $q^v$ axis current. Assuming $\theta_L$ is small, the position error $\theta_L$ can be calculated from equation (9), below:

$$\theta_L \approx \frac{pi_{qh}^v}{u_{d\_inj}^v}\left(\frac{L_d L_q}{L_q - L_d}\right) \tag{9}$$

Here, we assume that the injection frequency is selected as equal to the switching frequency, and the currents are measured twice for every pulse-width modulation (PWM) period. Since the injection HF signal is square wave type signal, the derivative of $q^v$ axis current can be calculated based on a differential between sampling currents. Therefore, equation (9) can be updated as equation (10), below:

$$\theta_L \approx \frac{\Delta i_{qh}^v}{U_{inj} \cdot T_s / 2}\left(\frac{L_d L_q}{L_q - L_d}\right) \tag{10}$$

From equation (10), it can be seen that $$\Delta i_{qh}^v \propto \theta_L.$$

The differential q-axis current signal $$\Delta i_{qh}^v$$

at a given time n can be represented using equation (11), below:

$$\Delta i_{qh}^v(n) = \text{sign}\left(u_{d\_inj}^v(n)\right) \cdot i_{qh}^v(n) \tag{11}$$

The difference and average value of two consecutive sampling currents can be used to extract the HF current $$i_{qh}^v(n)$$

from the measured current, so that filters are not required. This extraction of the HF current $$i_{qh}^v(n)$$

may also be called demodulation. Assuming that the HF injection frequency is set the same as the switching frequency and the currents are measured twice for every pulse-width modulation (PWM) period, the fundamental current components can be considered as unchanged and the magnitude of HF current components can be considered as unchanged between two consecutive sampling time due to the characteristic of the injected square wave voltage signal. Therefore, the HF current at each sampling instant can be written as equation set (12), below.

$$\begin{cases} i_{dqh}^v(n-1) = i_{dq}^v(n-1) - i_{dqf}^v(n) \\ i_{dqh}^v(n) = -i_{dq}^v(n) + i_{dqf}^v(n) \end{cases} \quad (12)$$

where $$i_{dq}^v(n),\ i_{dqf}^v(n) \text{ and } i_{dqh}^v(n)$$

are measured currents, fundamental currents and HF currents in the $d^v q^v$-axis, respectively.

Therefore, the fundamental currents in the $d^v q^v$-axis sampling instant n can be deduced as equation (13), below.

$$i_{dqf}^v(n) = \frac{i_{dq}^v(n-1) + i_{dq}^v(n)}{2} \quad (13)$$

Combining equation (11) and equation (13), $$i_{qh}^v(n)$$

can be represented as equation (14), below.

$$\Delta i_{qh}^v(n) = \text{sign}\left(u_{d\_inj}^v(n)\right)\left(i_q^v(n) - \frac{i_q^v(n) + i_q^v(n-1)}{2}\right) \quad (14)$$

Since $$i_{qh}^v(n)$$

is proportional to the position error BL based on equation (10), the position error $\theta_L$ can be forced to zero by using a PI controller to control the signal $$i_{qh}^v(n)$$

calculated from equation (14). It can also be seen that the calculation of signal $$i_{qh}^v(n)$$

is independent to the machine parameter. Since the sampled currents are used in (14), the sampling delay error may cause problems for the calculation of $$i_{qh}^v.$$

Therefore, the sampling delay can be compensated by delaying the sampling instance in the implementation.

Reference Speed Compensation

To further improve the dynamic performance, the speed of virtual synchronous frame is compensated as equation (15), below.

$$\omega_{after\_com}^* = \omega_e^v + K\Delta i_{qh}^v \propto \omega_e^v + K\theta_L \quad (15)$$

where K is the positive gain of compensation speed. When the load torque suddenly increases, the real synchronous frame will lag behind the virtual synchronous frame, then the $\theta_L$ will be negative. Based on equation (15), $$\omega_{after\_com}^*$$

will decrease, which slows the virtual synchronous frame to achieve a new balance.

MTPA Operation for the Proposed if Method

Once the differential q-axis current signal $$\Delta i_{qh}^v$$

has been minimized to zero through PI controller, the q-axis current will converge to a desired level according to the actual load level. To further reduce the copper losses, the MTPA algorithm is used to calculate d-axis reference current based on equation (16), below, after $$\Delta i_{qh}^v$$

has been minimized within desired range.

$$i_{dref\_mtpa}^v = -\frac{\psi_f}{2(L_d - L_q)} + \sqrt{\left(\frac{\psi_f}{2(L_d - L_q)}\right)^2 + \left(i_{qref\_mtpa}^v\right)^2} \quad (16)$$

Figure 4:
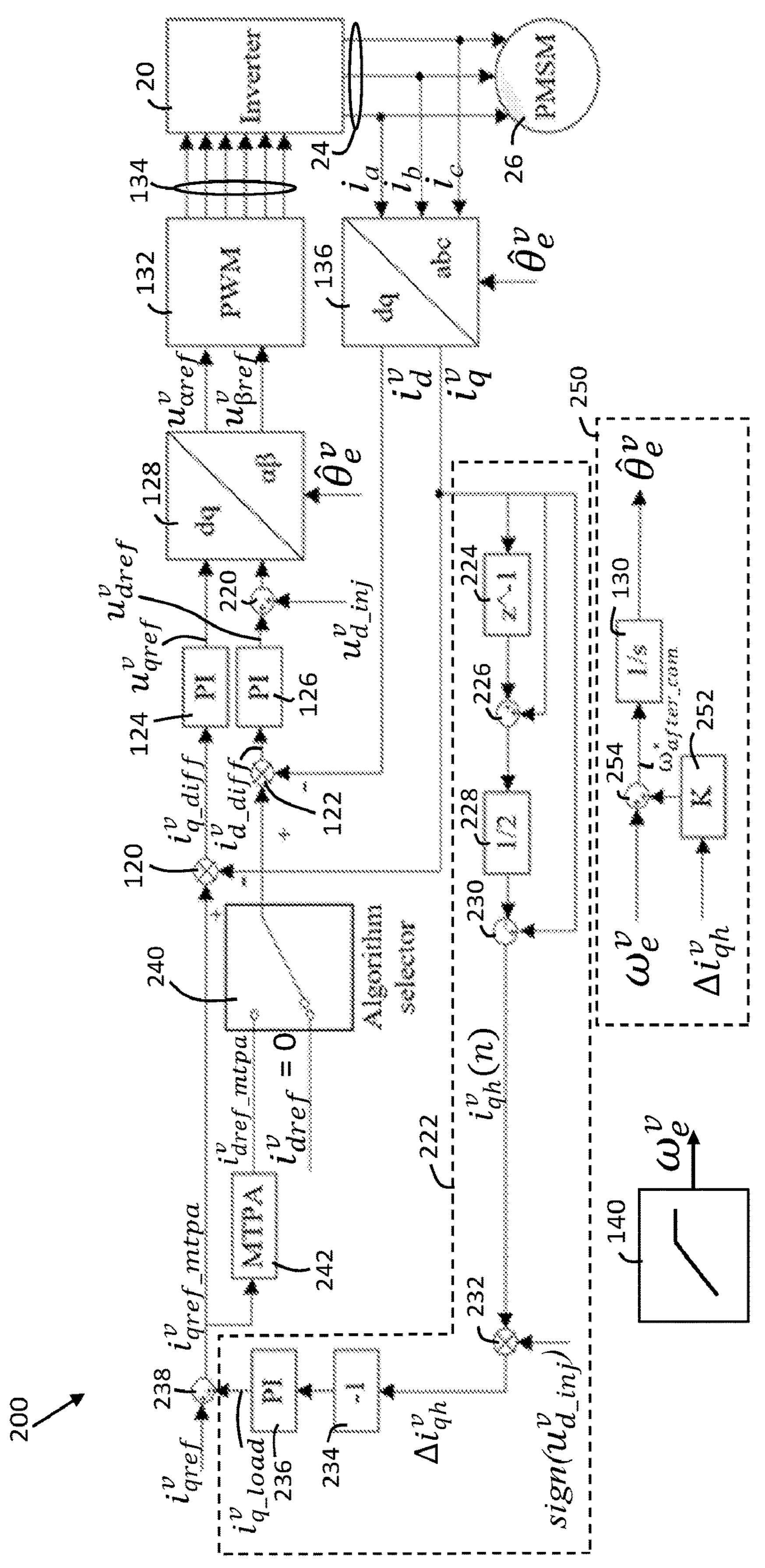
FIG. 4 shows a block diagram of a motor control system for enhanced I/F startup control in accordance with aspects of the present disclosure.

FIG. 4 shows a block diagram of a second motor control system 200, which is configured for enhanced I/F startup control. The second motor control system 200 may be similar or identical to the first motor control system 100, with some additional features described herein.

The second motor control system 200 includes a first adder 220 configured to add an injection voltage signal $$u_{d\_inj}^v$$

to the d-axis reference voltage $$u_{dref}^v,$$

the sum of which are then passed to the first transform block 128 in place of the d-axis reference voltage $$u_{dref}^v.$$

The injection voltage signal $$u^v_{d\_inj}$$

may be a high-frequency square-wave signal. In some embodiments, the d-axis injection voltage signal $$u^v_{d\_inj}$$

may have a frequency equal to the switching frequency of the solid-state switches 22 of the inverter 20.

The second motor control system 200 also includes a demodulator 222 configured to determine a load-based q-axis current $$i^v_{q\_load}$$

corresponding to a load on the electric motor 26 and based on the effect of the d-axis injection voltage signal $$u^v_{d\_inj}.$$

The demodulator 222 also includes a delay block 224 configured to sample the actual q-axis current $$i^v_q$$

and to generate a delayed q-axis current signal representing the actual q-axis current $$i^v_q$$

at a previous sample time. The demodulator 222 also includes a second adder 226 configured to add the delayed q-axis current signal to the actual q-axis current $$i^v_q.$$

The demodulator 222 also includes a divider 228 configured to divide the sum of the delayed q-axis current signal and the current actual q-axis current $$i^v_q$$

by two. Together, the second adder 226 and the divider 228 function to generate an average of the actual q-axis current $$i^v_q$$

at the current time and the actual q-axis current $$i^v_q$$

at the previous sample time. The demodulator 222 also includes a third difference block 230 configured to subtract the average q-axis current from the divider 228 from the actual q-axis current $$i^v_q$$

at the current time to generate a high-frequency q-axis current signal for the current time $$i^v_{qh}(n).$$

The demodulator 222 also includes a multiplier block 232 configured to multiply the high-frequency q-axis current signal for the current time $$i^v_{qh}(n)$$

by 1, 0, or −1, based on the sign of the injection voltage signal $$u^v_{d\_inj}$$

at that instant of time, n and to produce a differential q-axis current signal $$\Delta i^v_{qh}.$$

A sign function, which may also be called a signum function, $$\text{sign}(i^v_{qh})$$

may be used as an input to multiplier block 232 and to produce the corresponding sign signal (1, 0, or −1). The multiplier block 232 may, therefore, implement equation (11).

The demodulator 222 also includes an inverter 234 configured to calculate an inverse of the differential q-axis current signal $$\Delta i^v_{qh}.$$

The demodulator 222 also includes a third PI controller 236 configured to calculate the load-based q-axis current $$i^v_{q\_load}$$

based on the inverse of the differential q-axis current signal $$\Delta i_{qh}^{v}$$

from the inverter 234. The second motor control system 200 also includes a third adder 238 configured to add the load-based q-axis current $$i_{q\_load}^{v}$$

to the q-axis reference current $$i_{qref}^{v}$$

to determine an adjusted q-axis reference current $$i_{mtpa\_qref}^{v},$$

which is provided to the first difference block 120 instead of the q-axis reference current $$i_{qref}^{v}.$$

The adjusted q-axis reference current $$i_{mtpa\_qref}^{v}$$

may correspond to a q-axis current value for the electric motor 26 to produce a maximum torque ampere (MTPA).

In some embodiments, and as also shown in FIG. 4, the second motor control system 200 also includes an algorithm selector 240 configured to select one of two or more different values of the d-axis reference current $$i_{dref}^{v}$$

to be provided to the second difference block 122. The algorithm selector 240 may set the d-axis reference current $$i_{dref}^{v}$$

equal to zero under some conditions, and to a different value in response to a triggering condition.

In some embodiments, and as also shown in FIG. 4, the second motor control system 200 also includes an MTPA calculator 242 configured to determine an d-axis MTPA reference current $$i_{mtpa\_dref}^{v}$$

based on the q-axis MTPA reference current $$i_{mtpa\_qref}^{v}.$$

The algorithm selector 240 may provide this d-axis MTPA reference current $$i_{mtpa\_dref}^{v}$$

to the second difference block 122 in response to the triggering condition.

In some embodiments, and as also shown in FIG. 4, the second motor control system 200 also includes a modified rotor position calculator 250 which is compensated to compensate the speed of the virtual synchronous frame. The modified rotor position calculator 250 includes a positive gain block 252 configured to multiply the differential q-axis current signal $$\Delta i_{qh}^{v}$$

by a positive gain constant K, which represents the positive gain of compensation speed. The modified rotor position calculator 250 also includes a fourth adder 254 configured to add the output of the positive gain block 252 to the ramp speed command $$\omega_{e}^{v}$$

to produce a compensated speed signal $$\omega_{after\_com}^{*}.$$

Together, the positive gain block 252 and the fourth adder 254 implement equation (15), described above. The modified rotor position calculator 250 also includes the integrator 130, which is configured to calculate the reference rotor position $$\hat{\theta}_{e}^{v}$$

by integrating the compensated speed signal $$\omega_{after\_com}^{*}.$$

Figure 5:
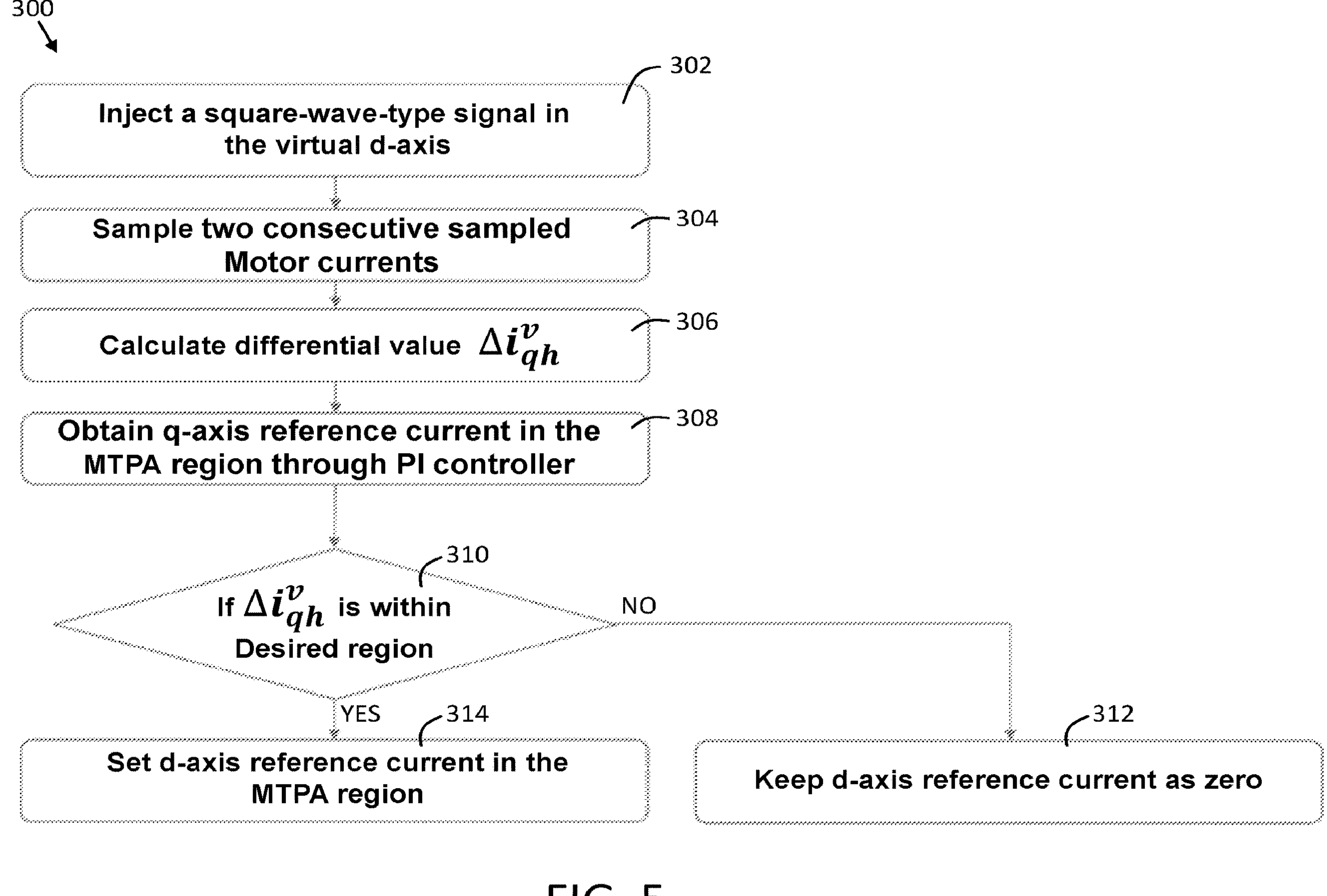
FIG. 5 shows a flow chart listing steps in a method for enhanced I/F startup control in accordance with aspects of the present disclosure.

FIG. 5 shows a flow chart listing steps in a method 300 for enhanced I/F startup control in accordance with aspects of the present disclosure. The method 300 includes injecting a square-wave type signal into the virtual d-axis reference voltage $$u_{dref}^{v}$$

at step 302. In some embodiments, the square wave type signal may be a square wave. However, the square wave type signal may be a periodic signal with a different waveform shape. The square-wave type signal may have a high frequency, substantially higher than the frequency of the AC power supplied to the electric motor 26. The square-wave type signal may have a frequency of, for example, 10 kHz. In some embodiments, the square-wave type signal may have a frequency equal to the switching frequency of the solid-state switches 22 of the inverter 20. However, other frequencies may be used.

The method 300 also includes sampling two consecutive motor currents at step 304. For example, the controller 30 may be configured to sample a current value of the actual q-axis current $$i_q^v.$$

The controller 30 may be further configured to implement the delay block 224 to sample generate a delayed q-axis current signal representing the actual q-axis current $$i_q^v$$

at a previous sample time.

The method 300 also includes calculating a differential q-axis current signal $$\Delta i_{qh}^v$$

at step 306. For example, the controller 30 may be configured to implement the third difference block 230 and the multiplier block 232 of the demodulator 222 to calculate the differential q-axis current signal $$\Delta i_{qh}^v$$

based on the current value of the actual q-axis current $$i_q^v$$

and based on the average q-axis current, where the average q-axis current is determined based on the two consecutive motor currents sampled at step 304.

The method 300 also includes obtaining a q-axis reference current in the MTPA region at step 308. For example, the controller 30 may be configured to implement the third PI controller 236 and the third adder 238 to determine the load-based q-axis current $$i_{q\_load}^v,$$

and to determine the q-axis MTPA reference current $$i_{mtpa\_qref}^v$$

based on the load-based q-axis current $$i_{q\_load}^v.$$

The method 300 also includes determining if the differential q-axis current signal $$\Delta i_{qh}^v$$

is within a desired region at step 310. For example, the controller 30 may be configured to compare the differential q-axis current signal $$\Delta i_{qh}^v$$

to a predetermined value and to indicate a triggering condition in response to the differential q-axis current signal $$\Delta i_{qh}^v$$

being less than the predetermined value.

The method 300 also includes setting the d-axis reference current to zero at step 312 and in response to determining the differential q-axis current signal $$\Delta i_{qh}^v$$

is not within the desired region at step 310. For example, the controller 30 may be configured to implement the algorithm selector 240 to set the d-axis reference current $$i_{dref}^v$$

equal to zero unless the triggering condition is indicated at step 310.

The method 300 also includes setting the d-axis reference current based on the q-axis MTPA reference current $$i_{mtpa\_qref}^v$$

value at step 314 and in response to determining the differential q-axis current signal $$\Delta i_{qh}^v$$

is within the desired region at step 310. For example, the controller 30 may be configured to implement the algorithm selector 240 to set the d-axis reference current $i^v_{dref}$ equal to the d-axis MTPA reference current $i^v_{mtpa\_dref}$ in response to the triggering condition being indicated at step 310.

Simulation Results

In order to verify the performance of the proposed I/F control method, experiments were carried out on the MATLAB/Simulink platform with 10 kHz PWM switching frequency. The amplitude of the injection voltage for estimating the rotor position was 30 V (around 6% of DC bus voltage), and its frequency was equal to the PWM switching frequency. The performance of the traditional I/F method and proposed I/F method are shown in FIGS. 6A-6J. The q-axis reference current is set as rated current 260A and the reference speed is set as 200 rad/sec. The load torque is set as 50 Nm. Compared with a traditional I/F method, the enhanced I/F method of the present disclosure can significantly reduce copper losses and torque ripple in the motor.

Figure 6A:
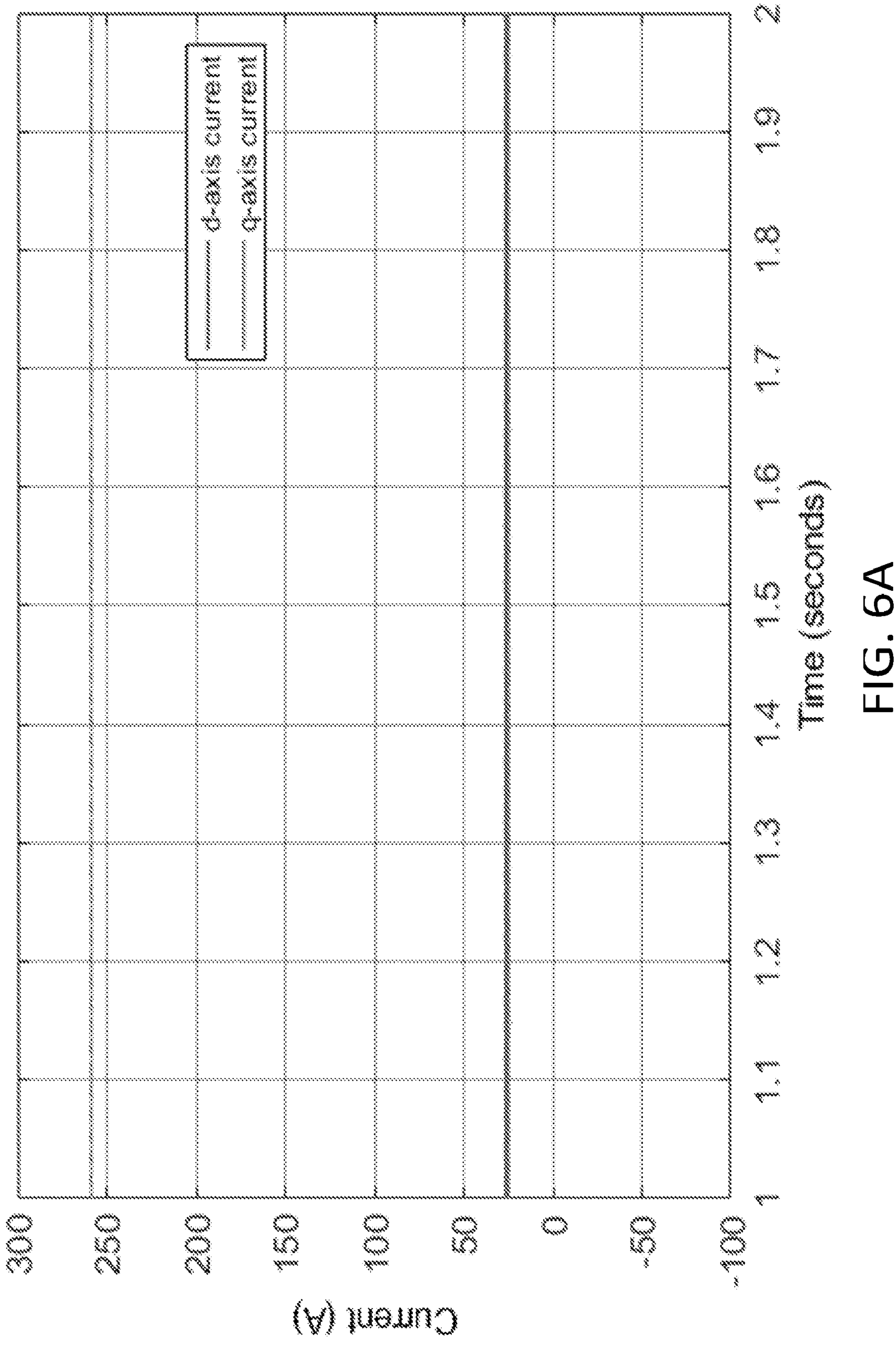
FIG. 6A shows a graph of d-axis current and q-axis current of a motor control system using traditional I/F startup control.
Figure 6B:
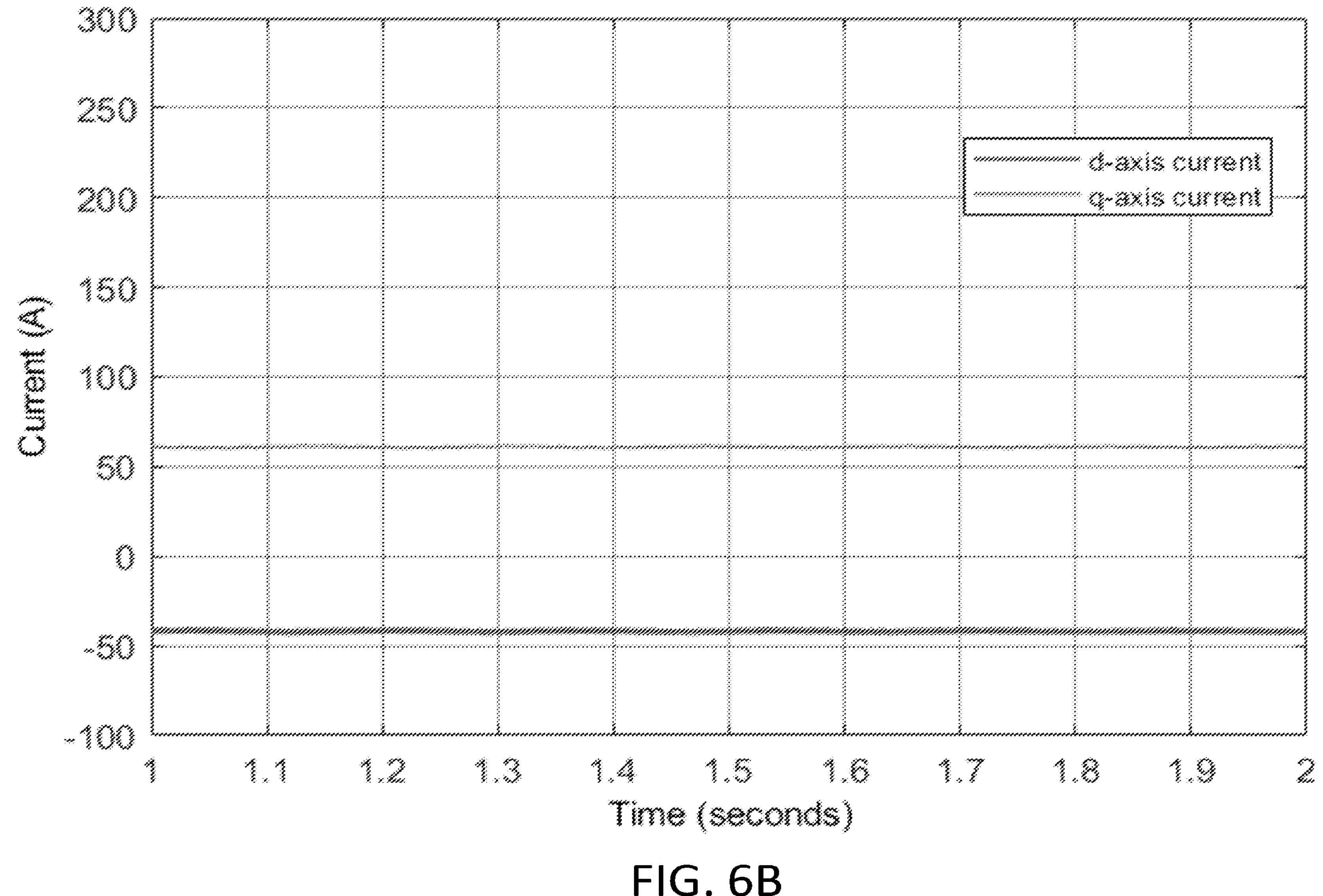
FIG. 6B shows a graph of d-axis current and q-axis current of a motor control system using enhanced I/F startup control in accordance with aspects of the present disclosure.
Figure 6C:
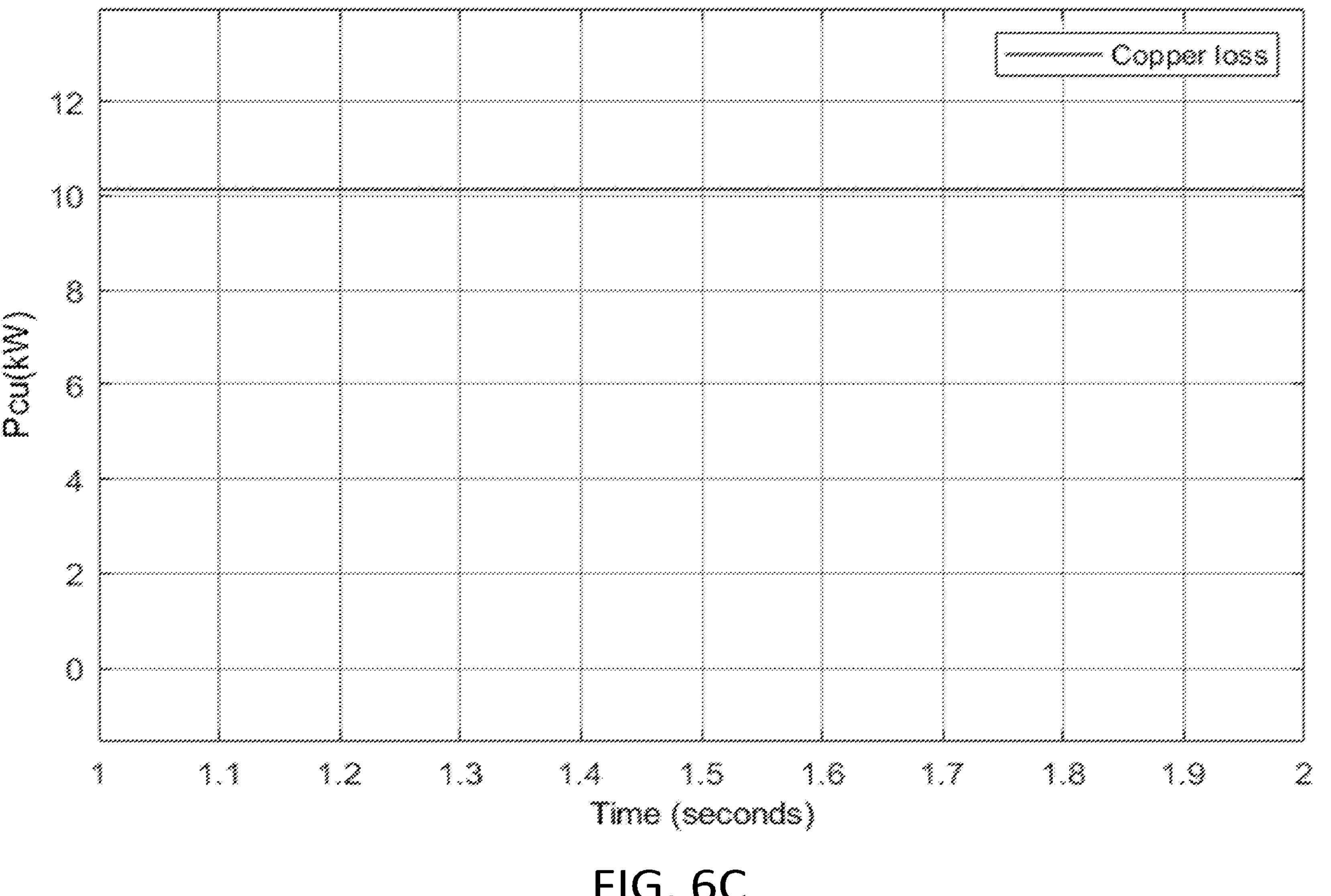
FIG. 6C shows a graph of copper losses of a motor control system using traditional I/F startup control.
Figure 6D:
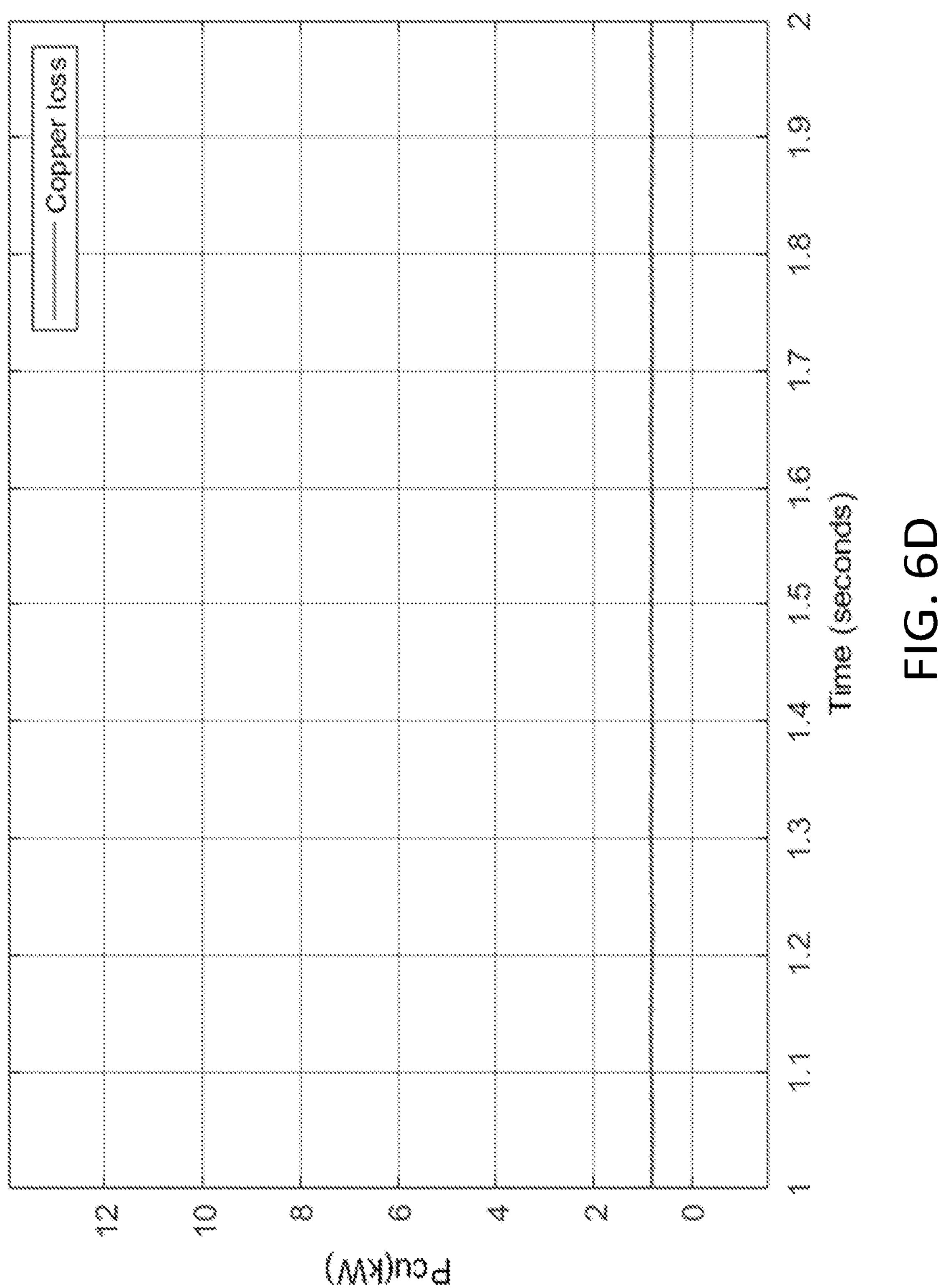
FIG. 6D shows a graph of copper losses of a motor control system using enhanced I/F startup control in accordance with aspects of the present disclosure.
Figure 6E:
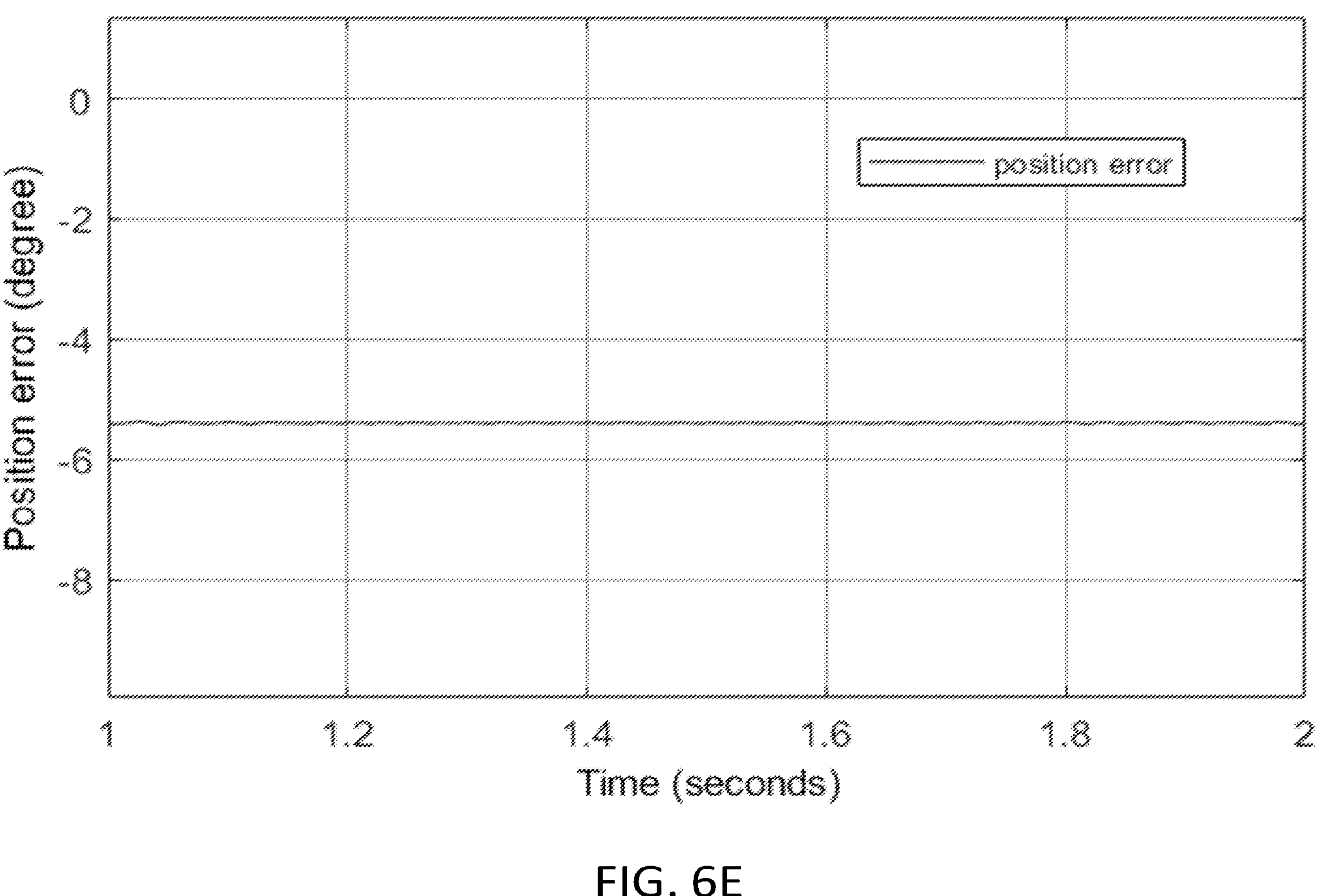
FIG. 6E shows a graph of position error of a motor control system using traditional I/F startup control.
Figure 6F:
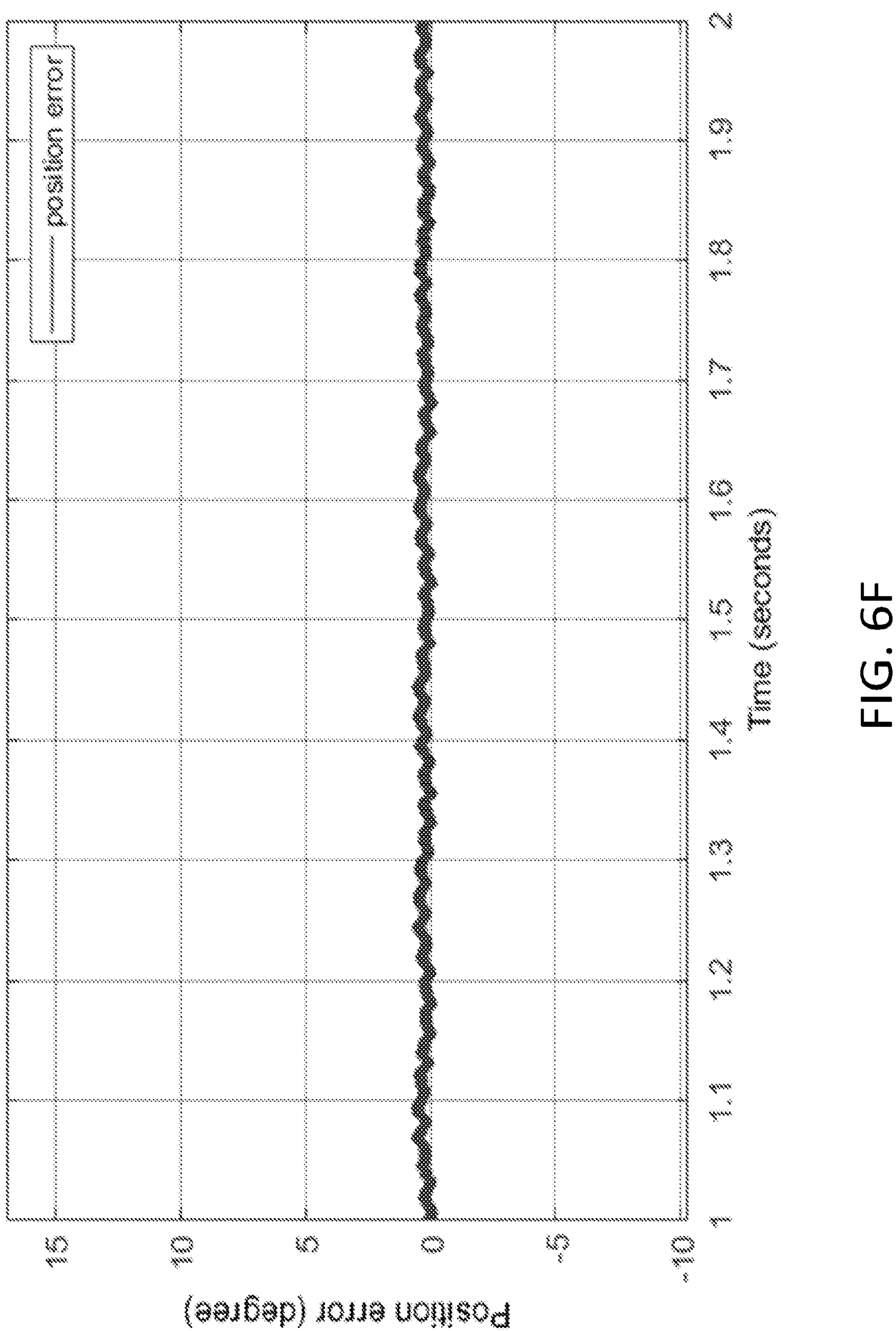
FIG. 6F shows a graph of position error of a motor control system using enhanced I/F startup control in accordance with aspects of the present disclosure.
Figure 6G:
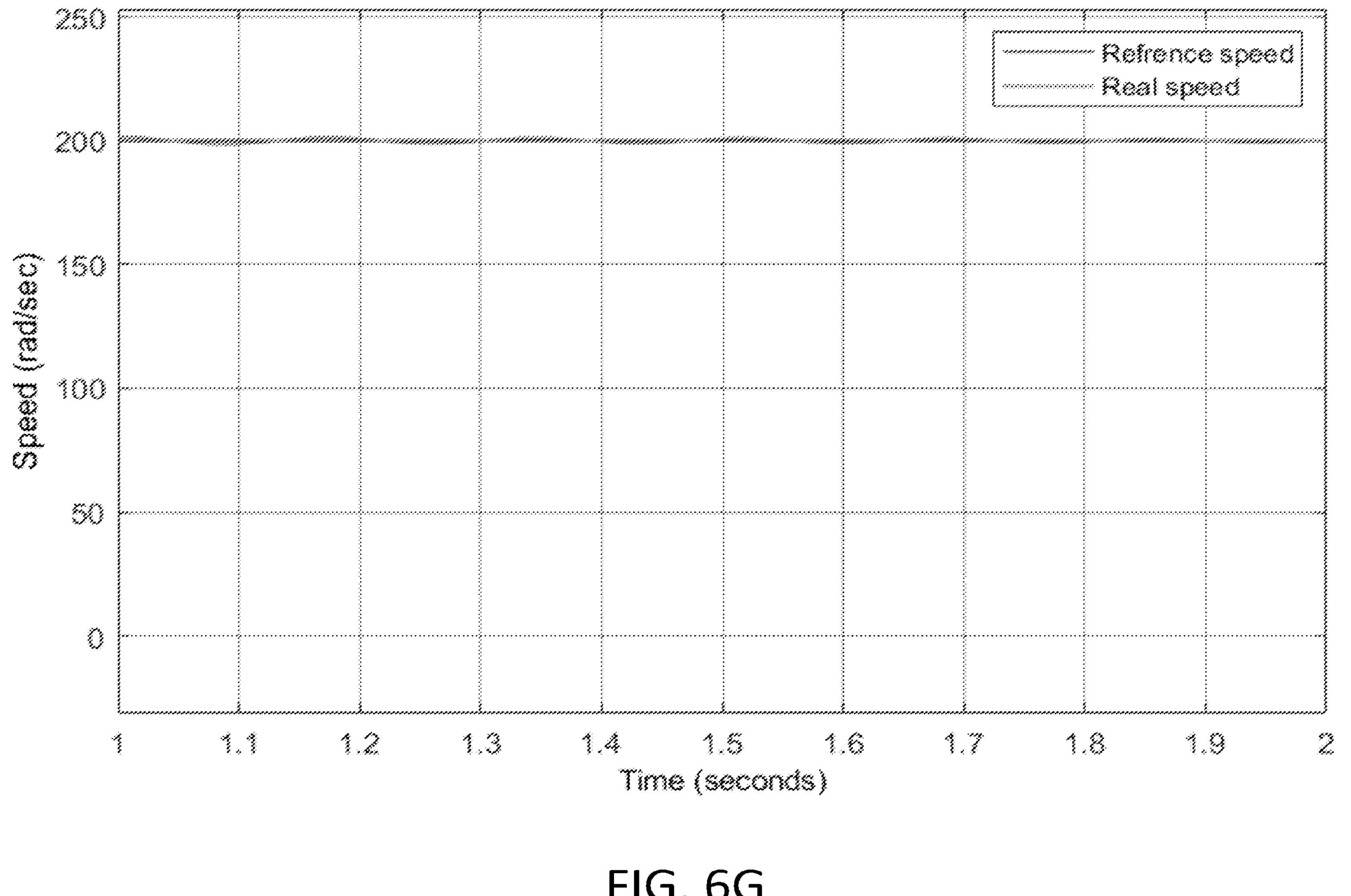
FIG. 6G shows a graph of motor speed in a motor control system using traditional I/F startup control.
Figure 6H:
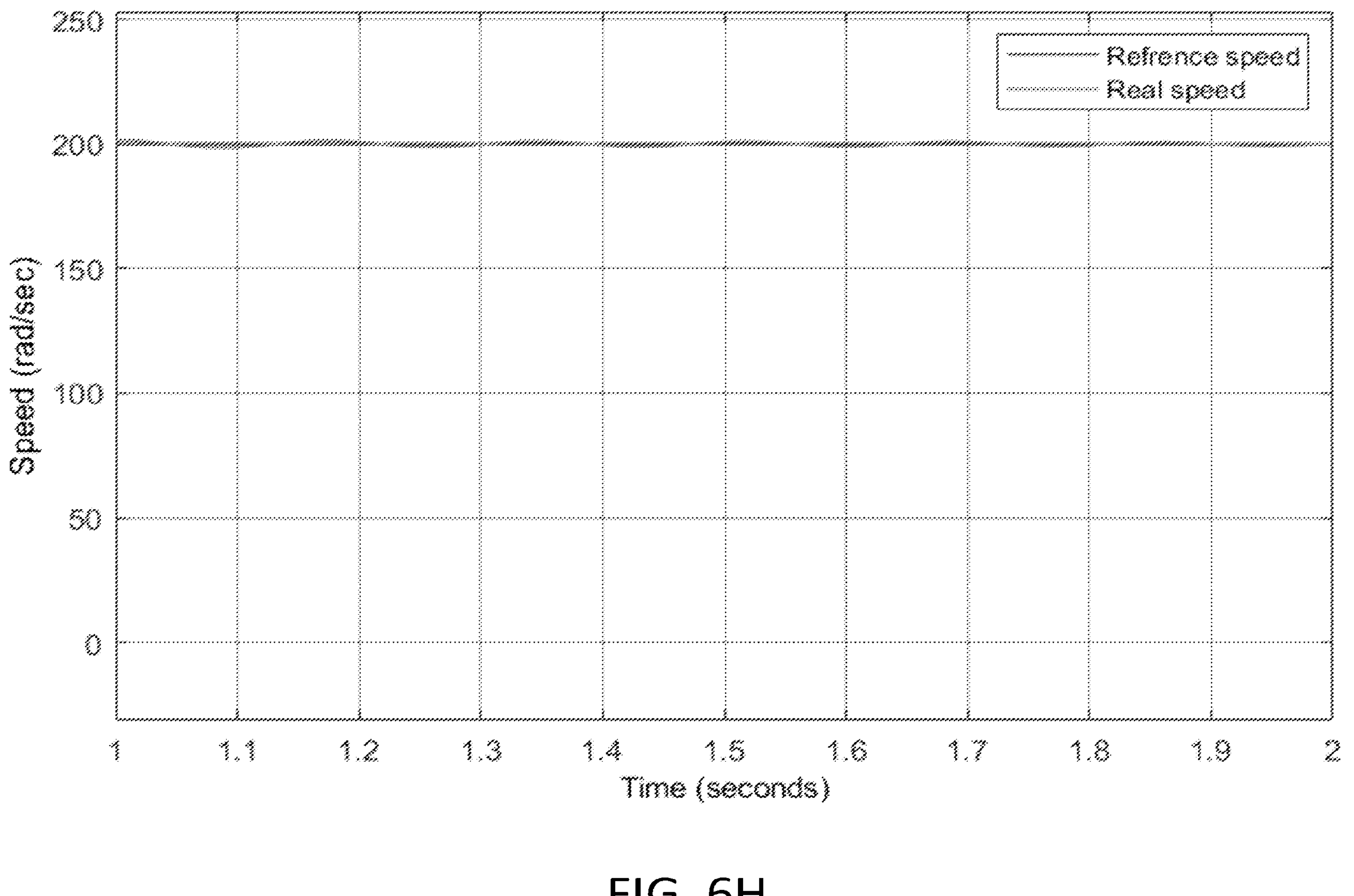
FIG. 6H shows a graph of motor speed in a motor control system using enhanced I/F startup control in accordance with aspects of the present disclosure.
Figure 6I:
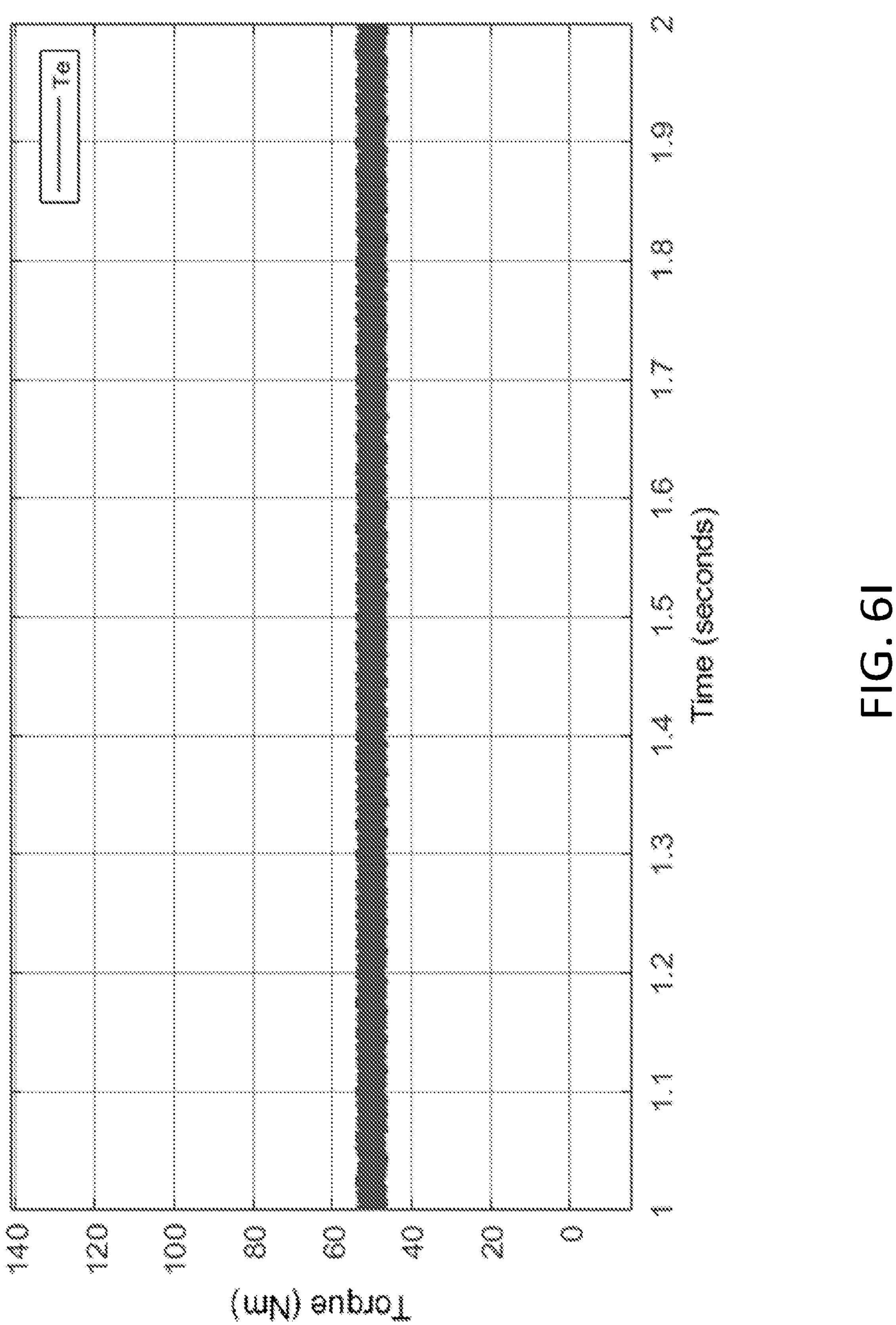
FIG. 6I shows a graph of torque in a motor control system using traditional I/F startup control.
Figure 6J:
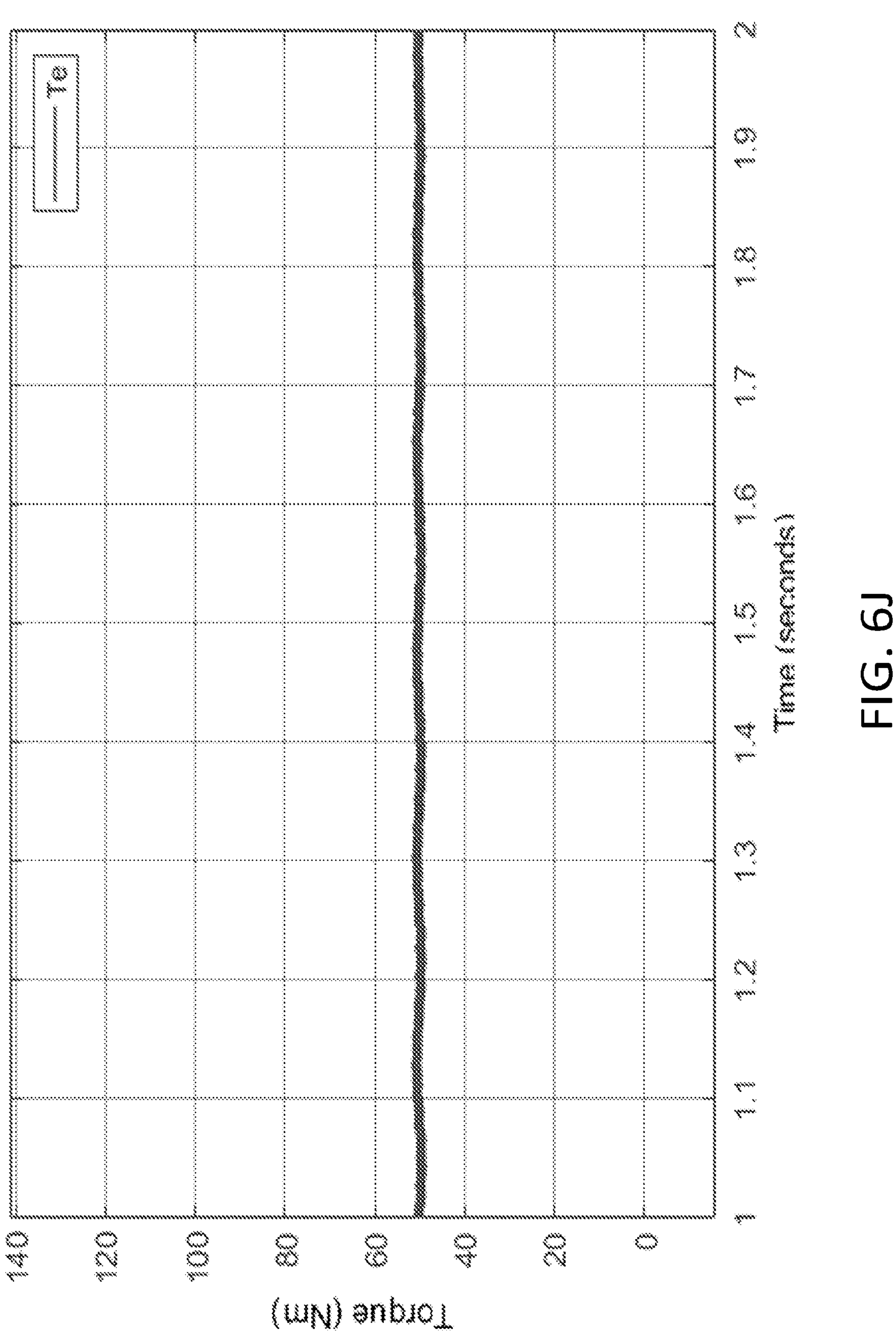
FIG. 6J shows a graph of torque in a motor control system using enhanced I/F startup control in accordance with aspects of the present disclosure.

FIGS. 6A, 6C, 6E, 6G, and 6I each show values for tests using a traditional I/F method, and FIGS. 6B, 6D, 6F, 6H, and 6J each show values for tests using the enhanced I/F method of the present disclosure. As shown in FIGS. 6A-6B, the enhanced I/F method of the present disclosure required substantially lower q-axis current of about 60 A, compared to 260 A using the traditional I/F method. As shown in FIGS. 6C-6D, the enhanced I/F method of the present disclosure provided substantially lower copper losses of about 0.8 kW, compared to about 10 kW using the traditional I/F method. As shown in FIGS. 6E-6F, the enhanced I/F method of the present disclosure provided substantially lower position error compared to the position error using the traditional I/F method. As shown in FIGS. 6G-6H, the enhanced I/F method of the present disclosure provided approximately the same speed control compared to the speed control using the traditional I/F method. As shown in FIGS. 6I-6J, the enhanced I/F method of the present disclosure generated substantially lower torque ripple compared to the torque ripple generated using the traditional I/F method.

The controller 30 may be configured to perform one or more steps in the method 300. For example, the processor 32 may execute instructions that cause the controller 30 to perform one or more of the steps. In some embodiments, the controller 30 may be configured to: determine a d-axis difference current based on a difference between a d-axis reference current and an actual d-axis current supplied by an inverter 20 to an electric machine, such as the electric motor 26; determine a load-based q-axis current corresponding to a load of the electric motor 26; determine an adjusted q-axis reference current based on a q-axis reference current and the load-based q-axis current; determine a q-axis difference current based on a difference between the adjusted q-axis reference current and an actual q-axis current supplied by the inverter 20 to the electric motor 26; determine a d-axis reference voltage based on the d-axis reference current; determine a q-axis reference voltage based on the q-axis reference current; determine an α-axis reference voltage and a β-axis reference voltage based on the d-axis reference voltage, the q-axis reference voltage, and a reference rotor position; determine the reference rotor position based on a reference rotor angular frequency; command a plurality of switches of the inverter 20 to apply an output voltage to the electric motor 26 based on the α-axis reference voltage and the β-axis reference voltage; increase the reference rotor angular frequency over a startup period of time while the d-axis reference current is zero and while the q-axis reference current is maintained at a constant value; add an injection voltage signal to the d-axis reference voltage; and determine, using a sum of the injection voltage signal and the d-axis reference voltage, the α-axis reference voltage and the β-axis reference voltage.

In accordance with an aspect of the disclosure, a method of operating a motor drive is provided. The method includes determining a d-axis difference current based on a difference between a d-axis reference current and an actual d-axis current supplied by an inverter to an electric machine. For example, the method may include using the second difference block 122 to determine the d-axis difference current $i^v_{d\_diff}$ by subtracting the actual d-axis current $i^v_d$ from the d-axis reference current $i^v_{dref}$.

The method also includes determining a load-based q-axis current corresponding to a load of the electric machine. For example, the method may include using the demodulator 222 configured to determine a load-based q-axis current $i^v_{q\_load}$ corresponding to a load on the electric motor 26.

The method also includes determining an adjusted q-axis reference current based on a q-axis reference current and the load-based q-axis current. For example, the method may include using the third adder 238 to add the load-based q-axis current $i^v_{q\_load}$ to the q-axis reference current $i^v_{qref}$ to determine the adjusted q-axis reference current $i^v_{mtpa\_qref}$.

The method also includes determining a q-axis difference current based on a difference between the adjusted q-axis reference current and an actual q-axis current supplied by the inverter to the electric machine. For example, the method may include using the first difference block 120 to subtract the actual q-axis current $$i_q^v$$

from the adjusted q-axis reference current $$i_{mtpa\_qref}^v$$

to determine a q-axis difference current $$i_{q\_diff}^v.$$

The method also includes determining a d-axis reference voltage based on the d-axis reference current. For example, the method may include using the second PI controller 126 to determine the d-axis reference voltage $$u_{dref}^v$$

based on the d-axis difference current $$i_{d\_diff}^v.$$

The method also includes determining a q-axis reference voltage based on the q-axis reference current. For example, the method may include using the first PI controller 124 to determine the q-axis reference voltage $$u_{qref}^v$$

based on the q-axis difference current $$i_{q\_diff}^v.$$

The method also includes determining an α-axis reference voltage and a β-axis reference voltage based on the d-axis reference voltage, the q-axis reference voltage, and a reference rotor position. For example, the method may include using the first transform block 128 to transform the q-axis reference voltage $$u_{qref}^v$$

and the d-axis reference voltage $$u_{dref}^v$$

to the αβ domain and to calculate the α-axis reference voltage $$u_{\alpha ref}^v$$

and the β-axis reference voltage $$u_{\beta ref}^v$$

based on the dq reference voltages $$u_{qref}^v,\ u_{dref}^v$$

and based on the reference rotor position $$\hat{\theta}_e^v.$$

The method also includes determining the reference rotor position based on a reference rotor angular frequency. For example, the method may include using the modified rotor position calculator 250 to calculate the reference rotor position $$\hat{\theta}_e^v$$

based on a reference rotor angular frequency, such as the ramp speed command $$\omega_e^v.$$

The method also includes commanding a plurality of switches of the inverter to apply an output voltage to the electric machine based on the α-axis reference voltage and the β-axis reference voltage. For example, the method may include using the pulse-width modulator 132 to generate pulse width modulation (PWM) signals on a plurality of control lines 134 for controlling the solid-state switches 22 of the inverter 20 based on the α-axis reference voltage $$u_{\alpha ref}^v$$

and the β-axis reference voltage $$u_{\beta ref}^v.$$

The method also includes increasing the reference rotor angular frequency over a startup period of time while the d-axis reference current is zero and while the q-axis reference current is maintained at a constant value. For example, the method may include using the speed ramp 140 to determine the ramp speed command $$\omega_e^v$$

by increasing the ramp speed command $$\omega_e^v$$

from an initial value to a final value over a startup period of time when the electric motor 26 is starting to be controlled by the first motor control system 100.

Determining the α-axis reference voltage and the β-axis reference voltage may include adding an injection voltage signal to the d-axis reference voltage. For example, the method may include using the first adder 220 to add the injection voltage signal $$u_{d\_inj}^v$$

to the d-axis reference voltage $$u_{dref}^v.$$

In some embodiments, the electric machine is a permanent magnet synchronous machine (PMSM).

In some embodiments, the output voltage is an alternating current (AC) voltage having an output AC frequency, and the injection voltage signal is a periodic signal with a high frequency substantially faster than the output AC frequency.

In some embodiments, the high frequency of the injection voltage is at least about 10 kHz.

In some embodiments, the high frequency of the injection voltage is equal to a switching frequency of the plurality of switches of the inverter.

In some embodiments, the injection voltage signal is a square wave signal.

In some embodiments, determining the load-based q-axis current corresponding to the load of the electric machine further comprises: demodulating at least one of the actual d-axis current and the actual q-axis current to determine a high-frequency current signal corresponding to the injection voltage signal; and determining the load-based q-axis current based on the high-frequency current corresponding to the injection voltage signal.

In some embodiments, demodulating the at least one of the actual d-axis current and the actual q-axis current to determine the high-frequency current corresponding to the injection voltage signal includes only performing simple arithmetic operations.

In some embodiments, demodulating the at least one of the actual d-axis current and the actual q-axis current to determine the high-frequency current corresponding to the injection voltage signal does not include any use of a filter.

In some embodiments, the at least one of the actual d-axis current and the actual q-axis current includes only the actual q-axis current.

In some embodiments, demodulating the at least one of the actual d-axis current and the actual q-axis current to determine the high-frequency current further includes: determining an average value of two consecutive samples of the at least one of the actual d-axis current and the actual q-axis current; and subtracting the average value of the two consecutive samples of the at least one of the actual d-axis current and the actual q-axis current from a current value of the at least one of the actual d-axis current and the actual q-axis current to determine the high-frequency current signal. For example, the method may include using the divider 228 to divide the sum of the delayed q-axis current signal and the current actual q-axis current $$i_q^v$$

by two to determine the average value of two consecutive samples, and the method may use the third difference block 230 to subtract the average value of the two consecutive samples from the actual q-axis current $$i_q^v$$

and to generate a high-frequency q-axis current signal for the current time $$i_{qh}^v(n).$$

In some embodiments, demodulating the at least one of the actual d-axis current and the actual q-axis current to determine the high-frequency current further includes determining a differential q-axis current signal based on the high-frequency current signal. For example, the method may include using the multiplier block 232 to multiply the high-frequency q-axis current signal for the current time $$i_{qh}^v(n)$$

by 1, 0, or −1, based on the sign of the injection voltage signal $$u_{d\_inj}^v$$

at that instant of time, n and to produce the differential q-axis current signal $$\Delta i_{qh}^v.$$

In some embodiments, demodulating the at least one of the actual d-axis current and the actual q-axis current to determine the high-frequency current also includes determining the load-based q-axis current based on the differential q-axis current signal. For example, the method may include using the third PI controller 236 to calculate the load-based q-axis current $i^v_{q\_load}$ In some embodiments, determining the load-based q-axis current based on the differential q-axis current signal further comprises applying a proportional-integral converter to determine the load-based q-axis current to cause the differential q-axis current signal to be minimized. For example, the method may include using the third PI controller 236 to calculate the load-based q-axis current $$i^v_{q\_load}$$

based on the inverse of the differential q-axis current signal $$\Delta i^v_{qh}$$

from the inverter 234.

In some embodiments, the method further includes calculating an adjusted d-axis reference current based on the adjusted q-axis reference current. For example, the method may include using MTPA calculator 242 to determine the d-axis MTPA reference current $$i^v_{mtpa\_dref}$$

based on the q-axis MTPA reference current $$i^v_{mtpa\_qref}.$$

In some embodiments, the method further includes using the adjusted d-axis reference current to determine the d-axis reference voltage in response to occurrence of a triggering condition. For example, the method may include using the algorithm selector 240 to select one of two or more different values of the d-axis reference current $$i^v_{dref}$$

to be provided to the second difference block 122 and in response to the triggering condition.

In some embodiments, the triggering condition includes a differential q-axis current signal being within a predetermined region. For example, the triggering condition may include the differential q-axis current signal having value within a predetermined range of values.

In some embodiments, the triggering condition includes the differential q-axis current signal being less than a predetermined value.

In some embodiments, demodulating the at least one of the actual d-axis current and the actual q-axis current to determine the high-frequency current further includes determining a differential q-axis current signal based on the high-frequency current signal. For example, the method may include using the multiplier block 232 to multiply the high-frequency q-axis current signal for the current time $$i^v_{qh}(n)$$

by 1, 0, or −1, based on the sign of the injection voltage signal $$u^v_{d\_inj}$$

that instant of time, n and to produce the differential q-axis current signal $$\Delta i^v_{qh}.$$

In some embodiments, determining the reference rotor position further includes determining the reference rotor position based on the differential q-axis current signal. For example, the method may include using the modified rotor position calculator 250 to calculate the reference rotor position $$\hat{\theta}^v_e$$

based on the differential q-axis current signal $$\Delta i^v_{qh}$$

and based on the ramp speed command $$\omega^v_e.$$

In some embodiments, determining the reference rotor position further includes multiplying the differential q-axis current signal by a positive gain constant to determine a scaled differential q-axis current signal. For example, the method may include using the positive gain block 252 of the modified rotor position calculator 250 to multiply the differential q-axis current signal $$\Delta i^v_{qh}$$

by the positive gain constant K, which represents the positive gain of compensation speed. Determining the reference rotor position may also include adding the reference rotor angular frequency to the scaled differential q-axis current signal to determine a sum of the reference rotor angular frequency and the scaled differential q-axis current signal. For example, the method may include using the fourth adder 254 to add the output of the positive gain block 252 to the ramp speed command $$\omega^v_e$$

to produce a compensated speed signal $$\omega^*_{after\_com}.$$

Determining the reference rotor position may also include integrating the sum of the reference rotor angular frequency and the scaled differential q-axis current signal to determine the reference rotor position. For example, the method may include using the integrator 130 to calculate the reference rotor position $$\hat{\theta}_e^v$$

by integrating the compensated speed signal $$\omega^*_{after\_com}$$

In accordance with an aspect of the disclosure, a motor drive system is disclosed. The motor drive system includes a controller. The controller is configured to: determine a d-axis difference current based on a difference between a d-axis reference current and an actual d-axis current supplied by an inverter to an electric machine; determine a load-based q-axis current corresponding to a load of the electric machine; determine an adjusted q-axis reference current based on a q-axis reference current and the load-based q-axis current; determine a q-axis difference current based on a difference between the adjusted q-axis reference current and an actual q-axis current supplied by the inverter to the electric machine; determine a d-axis reference voltage based on the d-axis reference current; determine a q-axis reference voltage based on the q-axis reference current; determine an α-axis reference voltage and a β-axis reference voltage based on the d-axis reference voltage, the q-axis reference voltage, and a reference rotor position; determine the reference rotor position based on a reference rotor angular frequency; command a plurality of switches of the inverter to apply an output voltage to the electric machine based on the α-axis reference voltage and the β-axis reference voltage; increase the reference rotor angular frequency over a startup period of time while the d-axis reference current is zero and while the q-axis reference current is maintained at a constant value; add an injection voltage signal to the d-axis reference voltage; and determine, using a sum of the injection voltage signal and the d-axis reference voltage, the α-axis reference voltage and the β-axis reference voltage.

The controller and its related methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of operating a motor drive comprising:

determining a d-axis difference current based on a difference between a d-axis reference current and an actual d-axis current supplied by an inverter to an electric machine;

determining a load-based q-axis current corresponding to a load of the electric machine;

determining an adjusted q-axis reference current based on a q-axis reference current and the load-based q-axis current;

determining a q-axis difference current based on a difference between the adjusted q-axis reference current and an actual q-axis current supplied by the inverter to the electric machine;

determining a d-axis reference voltage based on the d-axis reference current;

determining a q-axis reference voltage based on the q-axis reference current;

determining an a-axis reference voltage and a β-axis reference voltage based on the d-axis reference voltage, the q-axis reference voltage, and a reference rotor position;

determining the reference rotor position based on a reference rotor angular frequency;

commanding a plurality of switches of the inverter to apply an output voltage to the electric machine based on the α-axis reference voltage and the β-axis reference voltage;

increasing the reference rotor angular frequency over a startup period of time while the d-axis reference current is zero and while the q-axis reference current is maintained at a constant value; and wherein determining the α-axis reference voltage and the β-axis reference voltage includes adding an injection voltage signal to the d-axis reference voltage.

2. The method of claim 1, wherein the electric machine is a permanent magnet synchronous machine (PMSM).

3. The method of claim 1, wherein the output voltage is an alternating current (AC) voltage having an output AC frequency, and the injection voltage signal is a periodic signal with a high frequency substantially faster than the output AC frequency.

4. The method of claim 3, wherein the high frequency of the injection voltage is at least about 10 kHz.

5. The method of claim 3, wherein the high frequency of the injection voltage is equal to a switching frequency of the plurality of switches of the inverter.

6. The method of claim 3, wherein the injection voltage signal is a square wave signal.

7. The method of claim 1, wherein determining the load-based q-axis current corresponding to the load of the electric machine further comprises:

demodulating at least one of the actual d-axis current and the actual q-axis current to determine a high-frequency current signal corresponding to the injection voltage signal; and determining the load-based q-axis current based on the high-frequency current corresponding to the injection voltage signal.

8. The method of claim 7, wherein demodulating the at least one of the actual d-axis current and the actual q-axis current to determine the high-frequency current corresponding to the injection voltage signal includes only performing simple arithmetic operations.

9. The method of claim 7, wherein demodulating the at least one of the actual d-axis current and the actual q-axis current to determine the high-frequency current corresponding to the injection voltage signal does not include any use of a filter.

10. The method of claim 7, wherein the at least one of the actual d-axis current and the actual q-axis current includes only the actual q-axis current.

11. The method of claim 7, wherein demodulating the at least one of the actual d-axis current and the actual q-axis current to determine the high-frequency current further includes:

determining an average value of two consecutive samples of the at least one of the actual d-axis current and the actual q-axis current; and subtracting the average value of the two consecutive samples of the at least one of the actual d-axis current and the actual q-axis current from a current value of the at least one of the actual d-axis current and the actual q-axis current to determine the high-frequency current signal.

12. The method of claim 7, wherein demodulating the at least one of the actual d-axis current and the actual q-axis current to determine the high-frequency current further includes:

determining a differential q-axis current signal based on the high-frequency current signal; and determining the load-based q-axis current based on the differential q-axis current signal.

13. The method of claim 12, wherein determining the load-based q-axis current based on the differential q-axis current signal further comprises applying a proportional-integral converter to determine the load-based q-axis current to cause the differential q-axis current signal to be minimized.

14. The method of claim 1, further comprising calculating an adjusted d-axis reference current based on the adjusted q-axis reference current; and using the adjusted d-axis reference current to determine the d-axis reference voltage in response to occurrence of a triggering condition.

15. The method of claim 14, wherein the triggering condition includes a differential q-axis current signal being within a predetermined region.

16. The method of claim 15, wherein the triggering condition includes the differential q-axis current signal being less than a predetermined value.

17. The method of claim 7, wherein demodulating the at least one of the actual d-axis current and the actual q-axis current to determine the high-frequency current further includes determining a differential q-axis current signal based on the high-frequency current signal; and wherein determining the reference rotor position further includes determining the reference rotor position based on the differential q-axis current signal.

18. The method of claim 17, wherein determining the reference rotor position further includes:

multiplying the differential q-axis current signal by a positive gain constant to determine a scaled differential q-axis current signal;

adding the reference rotor angular frequency to the scaled differential q-axis current signal to determine a sum of the reference rotor angular frequency and the scaled differential q-axis current signal; and integrating the sum of the reference rotor angular frequency and the scaled differential q-axis current signal to determine the reference rotor position.

19. A motor drive system comprising:

a controller configured to:

determine a d-axis difference current based on a difference between a d-axis reference current and an actual d-axis current supplied by an inverter to an electric machine;

determine a load-based q-axis current corresponding to a load of the electric machine;

determine an adjusted q-axis reference current based on a q-axis reference current and the load-based q-axis current;

determine a q-axis difference current based on a difference between the adjusted q-axis reference current and an actual q-axis current supplied by the inverter to the electric machine;

determine a d-axis reference voltage based on the d-axis reference current;

determine a q-axis reference voltage based on the q-axis reference current;

determine an α-axis reference voltage and a β-axis reference voltage based on the d-axis reference voltage, the q-axis reference voltage, and a reference rotor position;

determine the reference rotor position based on a reference rotor angular frequency;

command a plurality of switches of the inverter to apply an output voltage to the electric machine based on the α-axis reference voltage and the β-axis reference voltage;

increase the reference rotor angular frequency over a startup period of time while the d-axis reference current is zero and while the q-axis reference current is maintained at a constant value;

add an injection voltage signal to the d-axis reference voltage; and determine, using a sum of the injection voltage signal and the d-axis reference voltage, the α-axis reference voltage and the β-axis reference voltage.

20. The motor drive system of claim 19, wherein the controller is further configured to:

demodulate at least one of the actual d-axis current and the actual q-axis current to determine a high-frequency current signal corresponding to the injection voltage signal; and determine the load-based q-axis current based on the high-frequency current corresponding to the injection voltage signal.

* * * * *